United States Patent [19]
Konta et al.

[11] Patent Number: 5,580,637
[45] Date of Patent: Dec. 3, 1996

[54] SANDWICH PANEL HAVING INTERNAL GAS DISCHARGE MEMBER

[75] Inventors: Hiroaki Konta, Higashine; Fumitaka Yoshida, Yamagata; Masahiko Suzuki, Sagae; Hiroyuki Umetsu; Hideki Takiguchi, both of Tendou, all of Japan

[73] Assignee: IG-Technical Research Inc., Higashine, Japan

[21] Appl. No.: 489,936

[22] Filed: Jun. 13, 1995

[30] Foreign Application Priority Data

Dec. 13, 1994 [JP] Japan ................................. 6-308035
Jan. 24, 1995 [JP] Japan ................................. 7-008591
Jan. 31, 1995 [JP] Japan ................................. 7-013236
Feb. 6, 1995 [JP] Japan ................................. 7-017565
Feb. 6, 1995 [JP] Japan ................................. 7-017566

[51] Int. Cl.$^6$ .................................................. B32B 3/10
[52] U.S. Cl. ........................ 428/138; 428/137; 428/192; 428/304.4; 428/315.5; 428/315.9; 428/703

[58] Field of Search .................................. 428/137, 138, 428/304.4, 315.5, 315.9, 192, 703

[56] References Cited

U.S. PATENT DOCUMENTS

5,206,067  4/1993  Bonzo ..................................... 428/138
5,403,645  4/1995  Stein et al. ............................. 428/138
5,500,270  3/1996  Langdon et al. ....................... 428/138

*Primary Examiner*—James J. Bell
*Attorney, Agent, or Firm*—Kanesaka & Takeuchi

[57] ABSTRACT

A sandwich panel which is formed by sandwiching a core member of synthetic resin foam (plastic foam) between a front surface member and a back surface member into an unified body, is provided with plural gas-permeable members in the core member or/and at the boundary between the core member and the front and/or back surface member of the sandwich panel, whereby internal gas produced in the core member is discharged through the gas-permeable members to the outside of the sandwich panel.

10 Claims, 49 Drawing Sheets

FIG.12(a) FIG.12(b) FIG.12(d) FIG.12(e)
FIG.12(c)
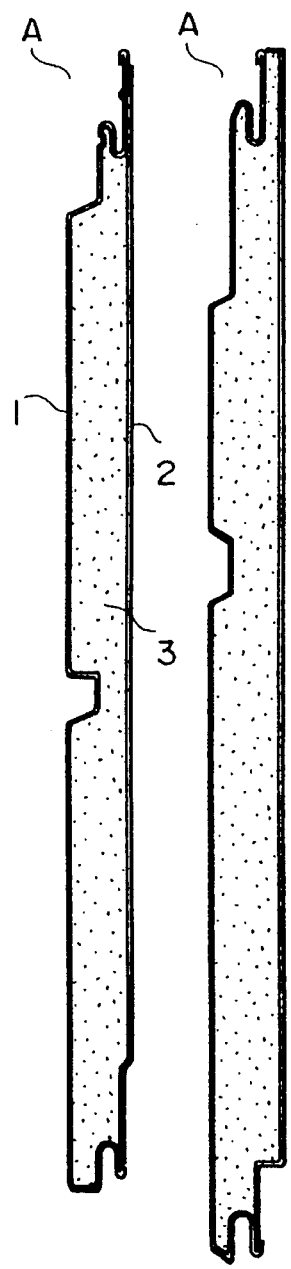
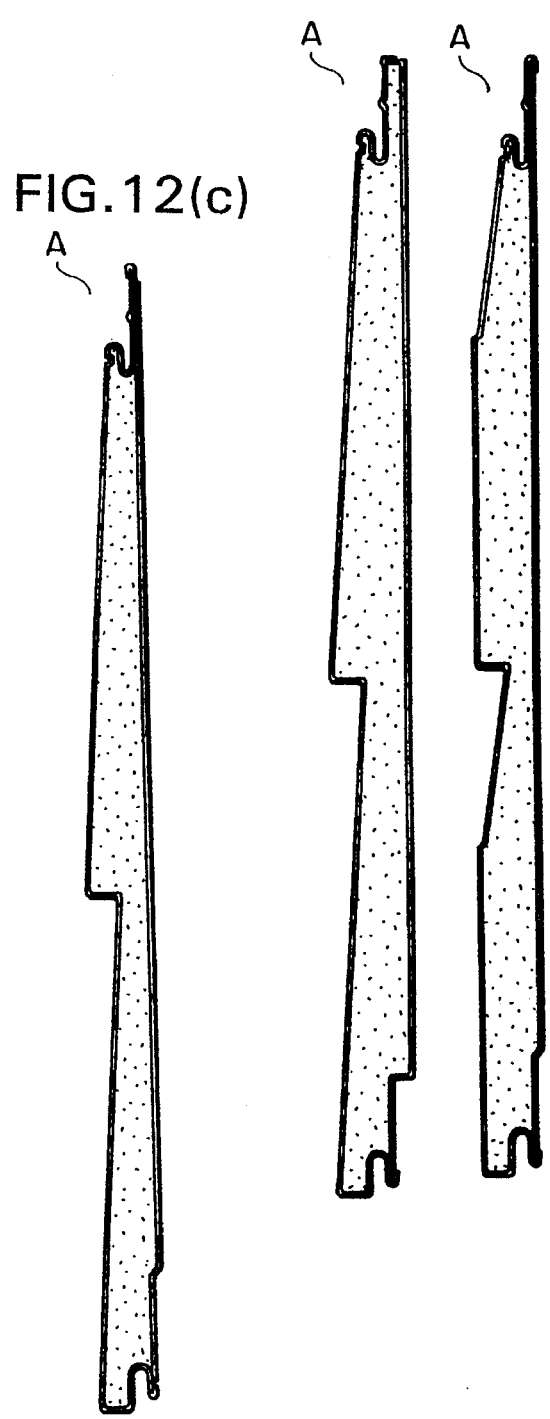

FIG.14(a) FIG.14(b)   FIG.14(d) FIG.14(e)
FIG.14(c)
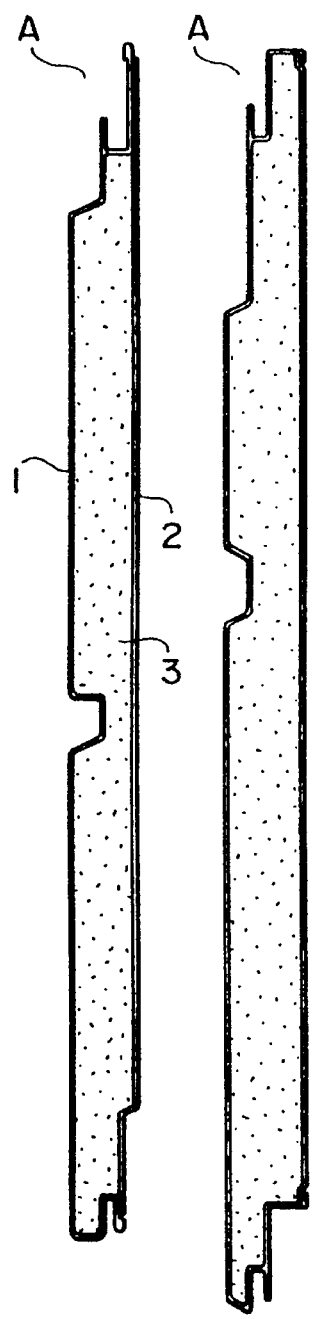
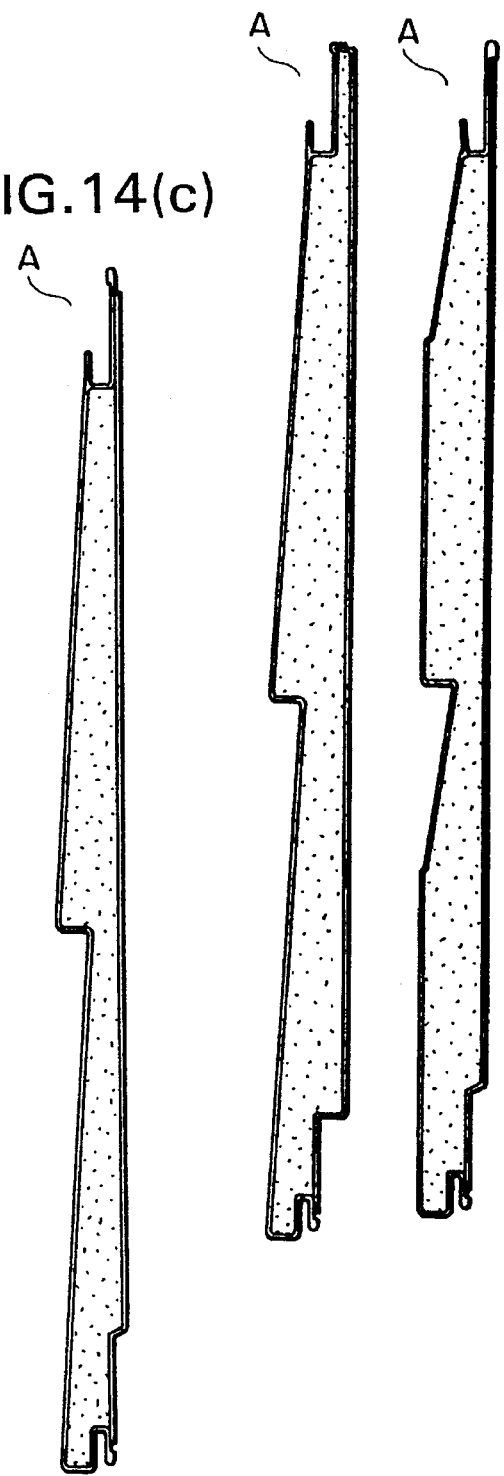

FIG.18(a) FIG.18(b) FIG.18(c) FIG.18(d)
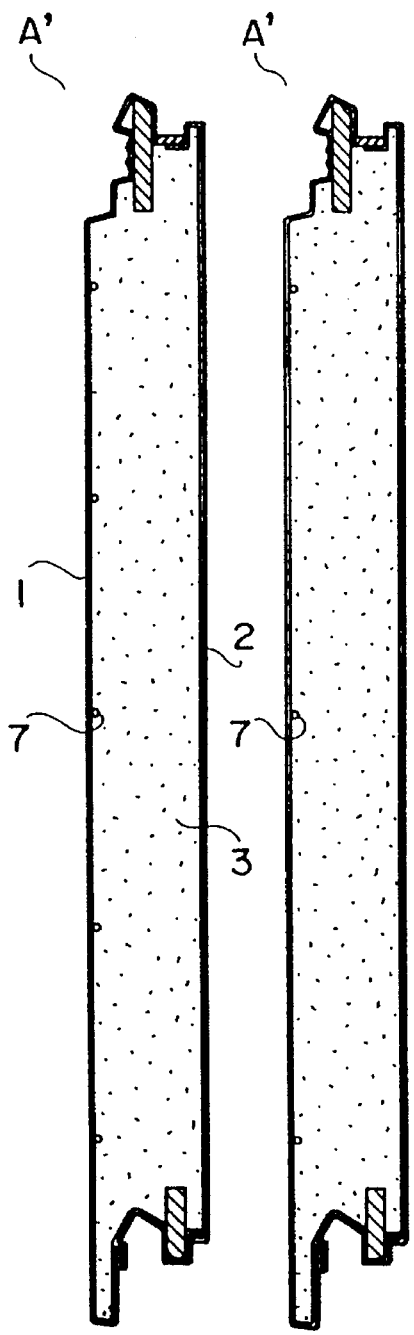
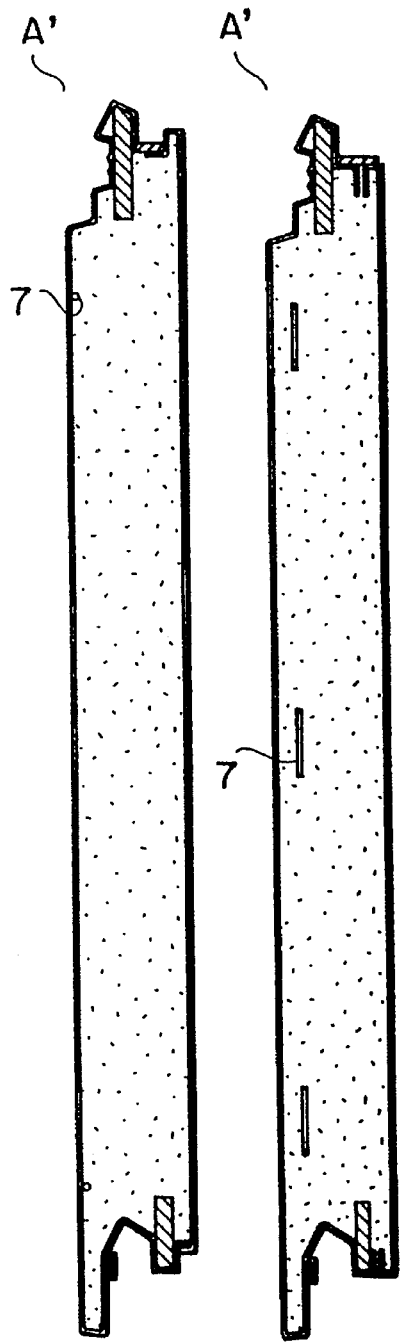

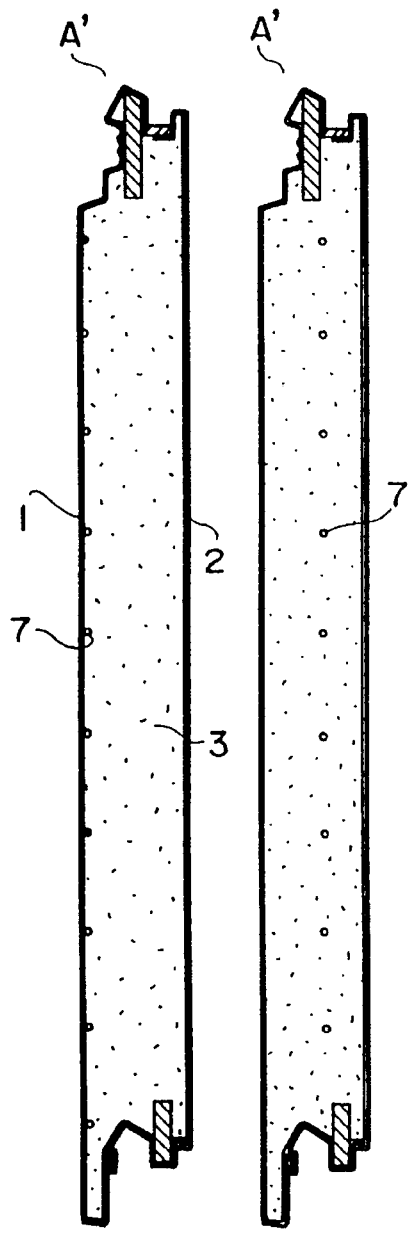
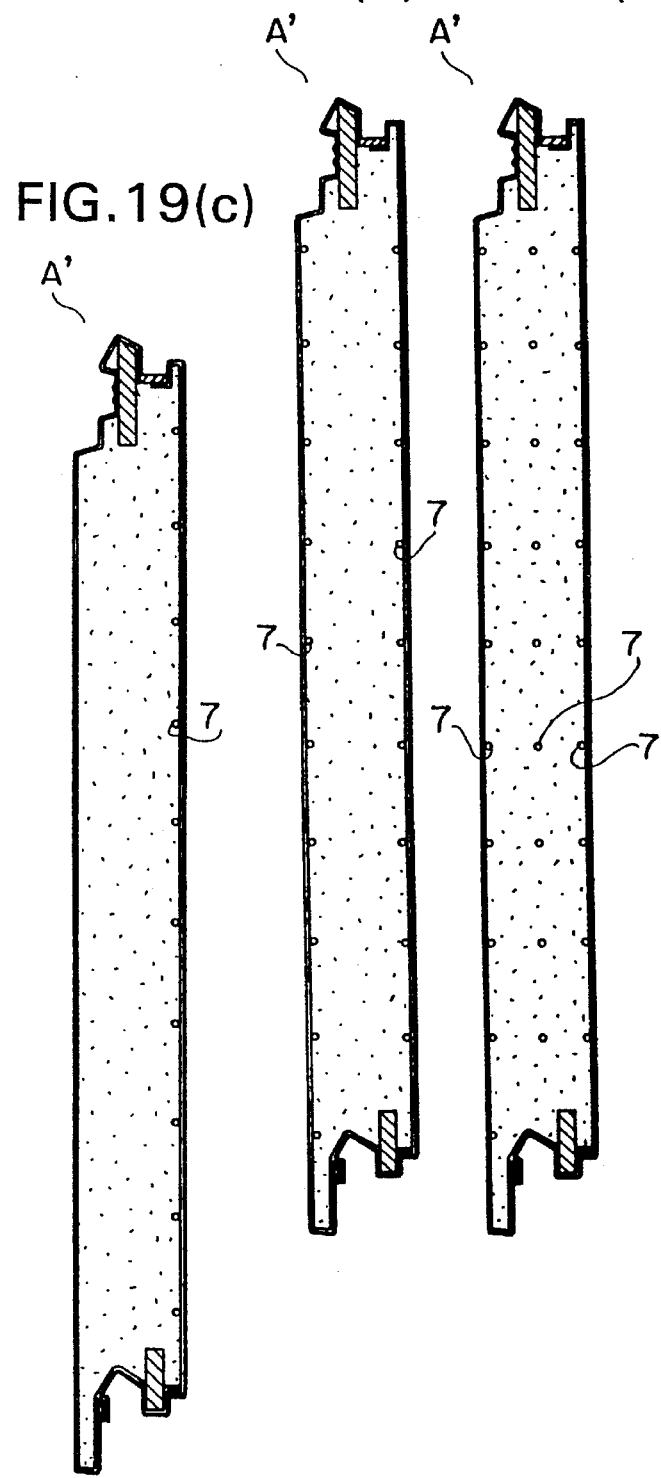
FIG.19(a) FIG.19(b) FIG.19(c) FIG.19(d) FIG.19(e)

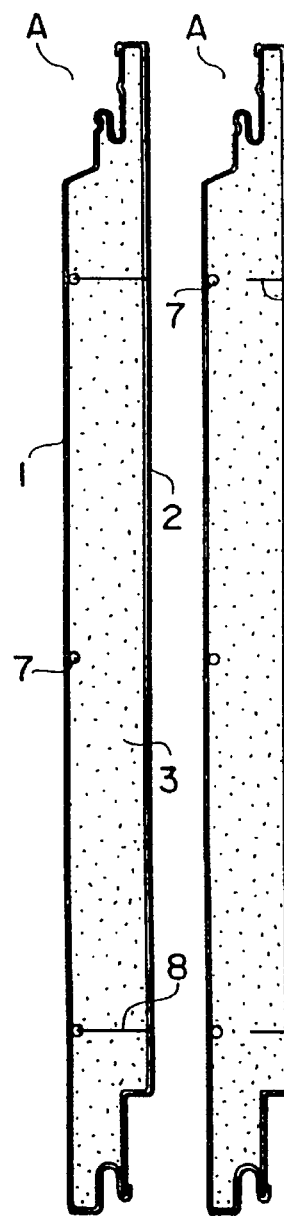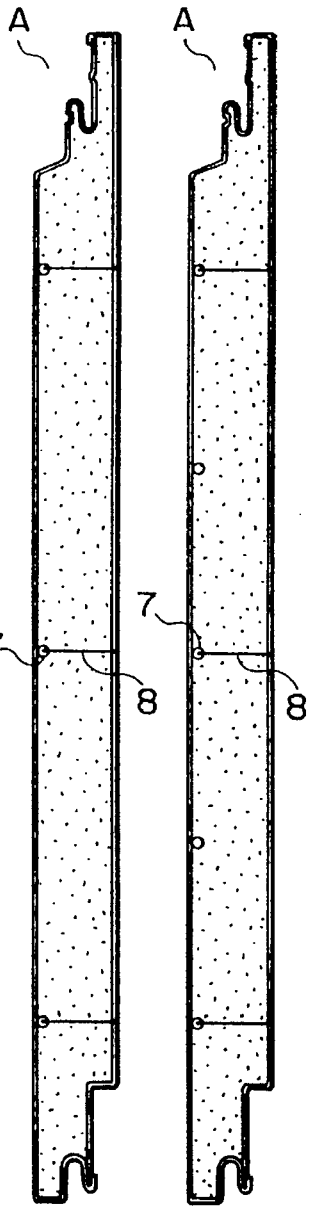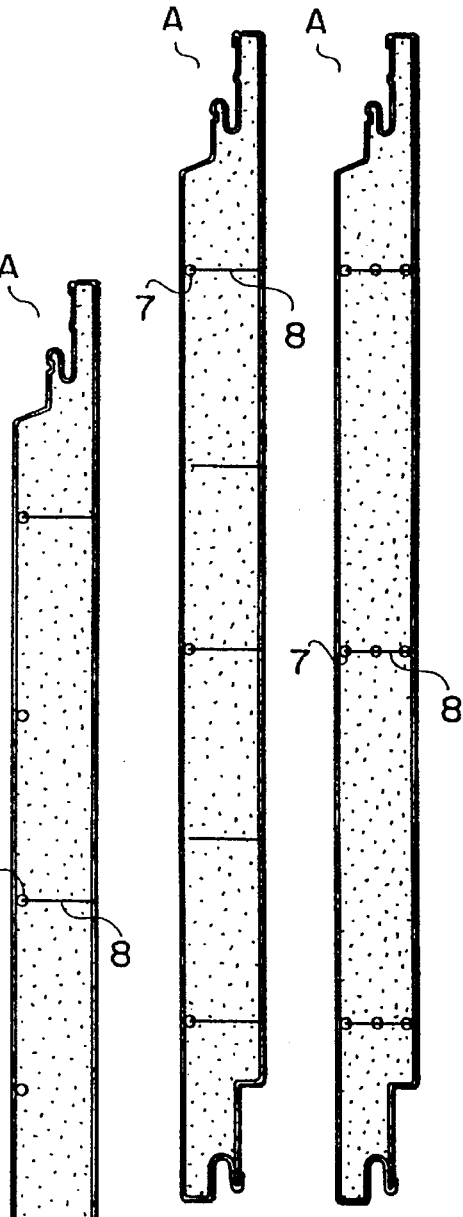

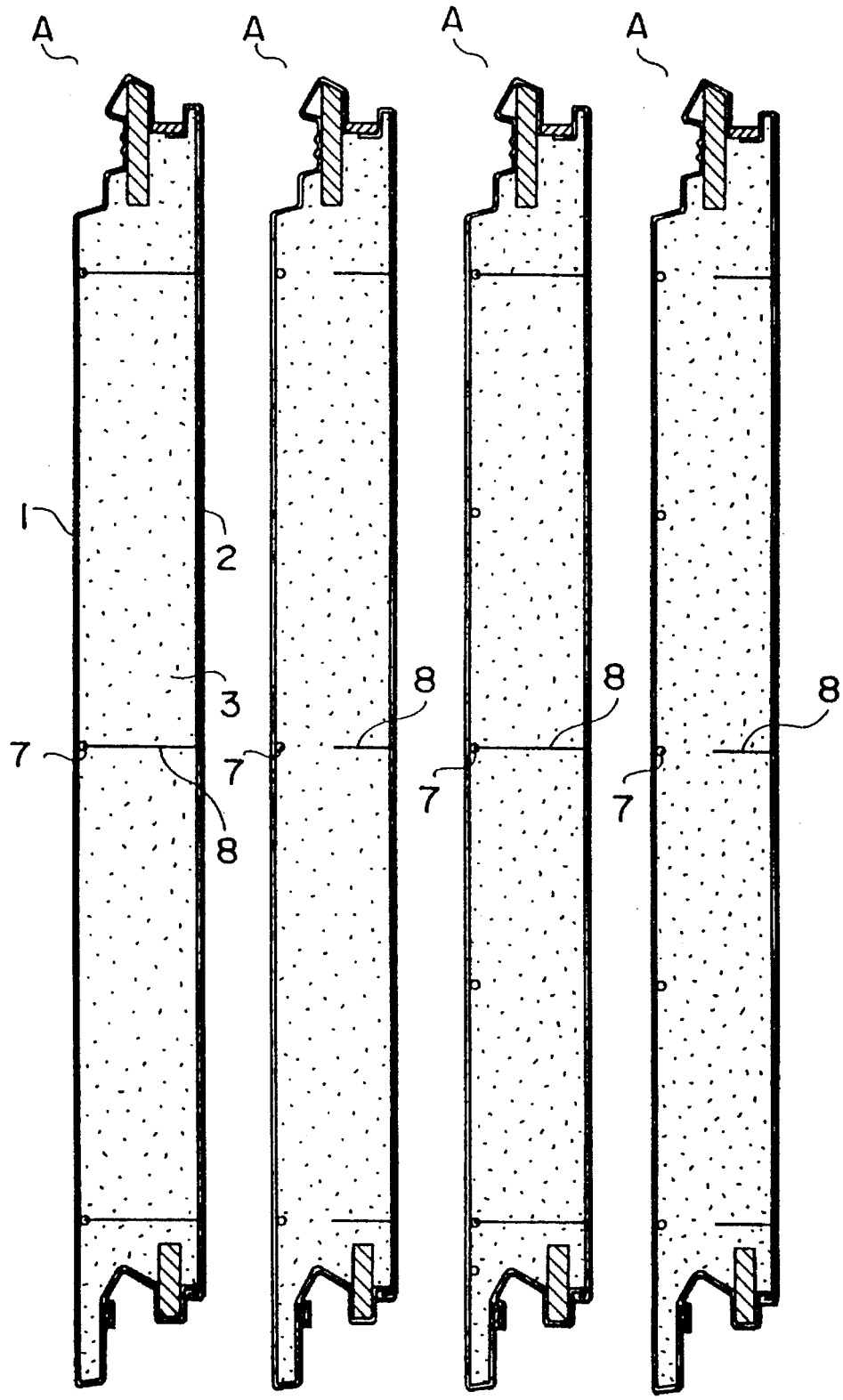

F I G . 38A
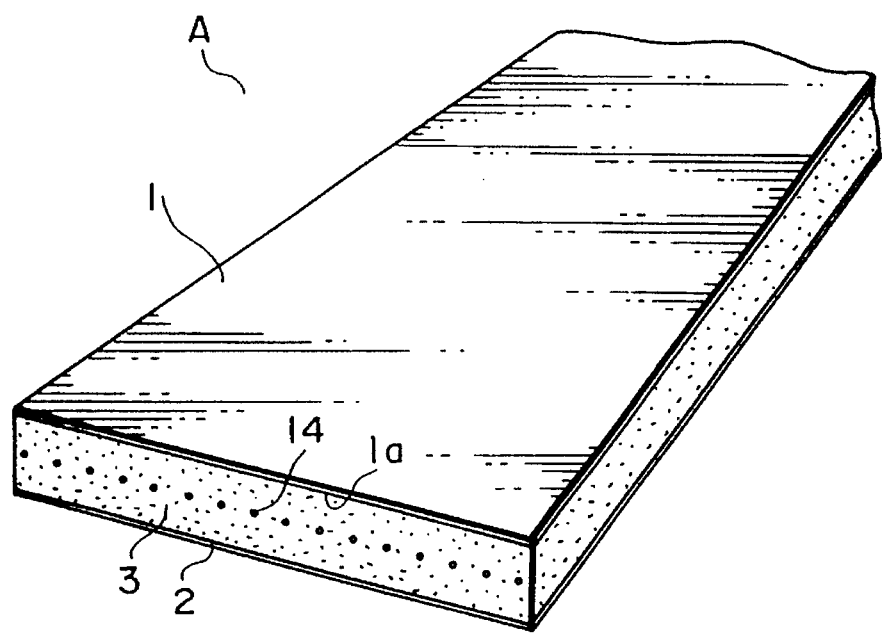
F I G . 38B
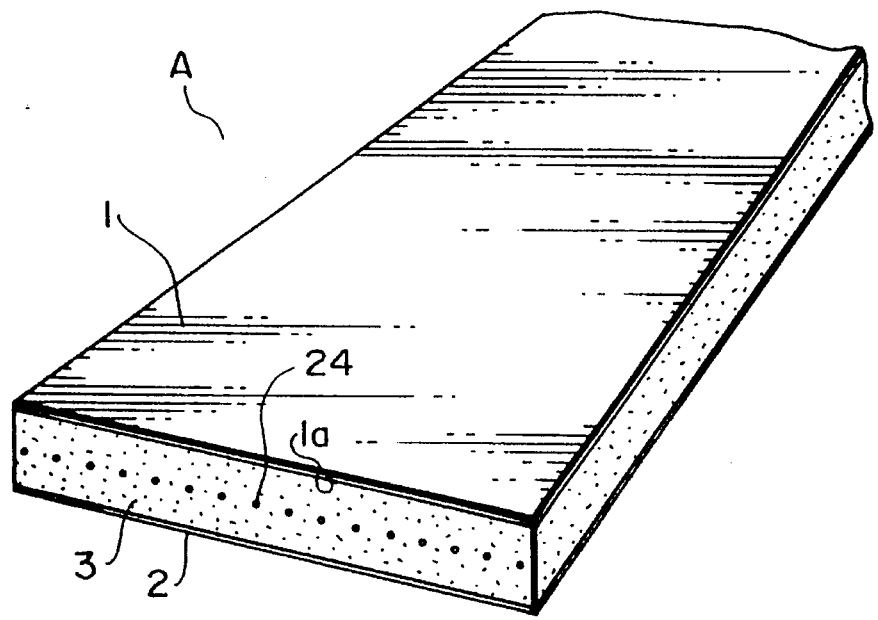

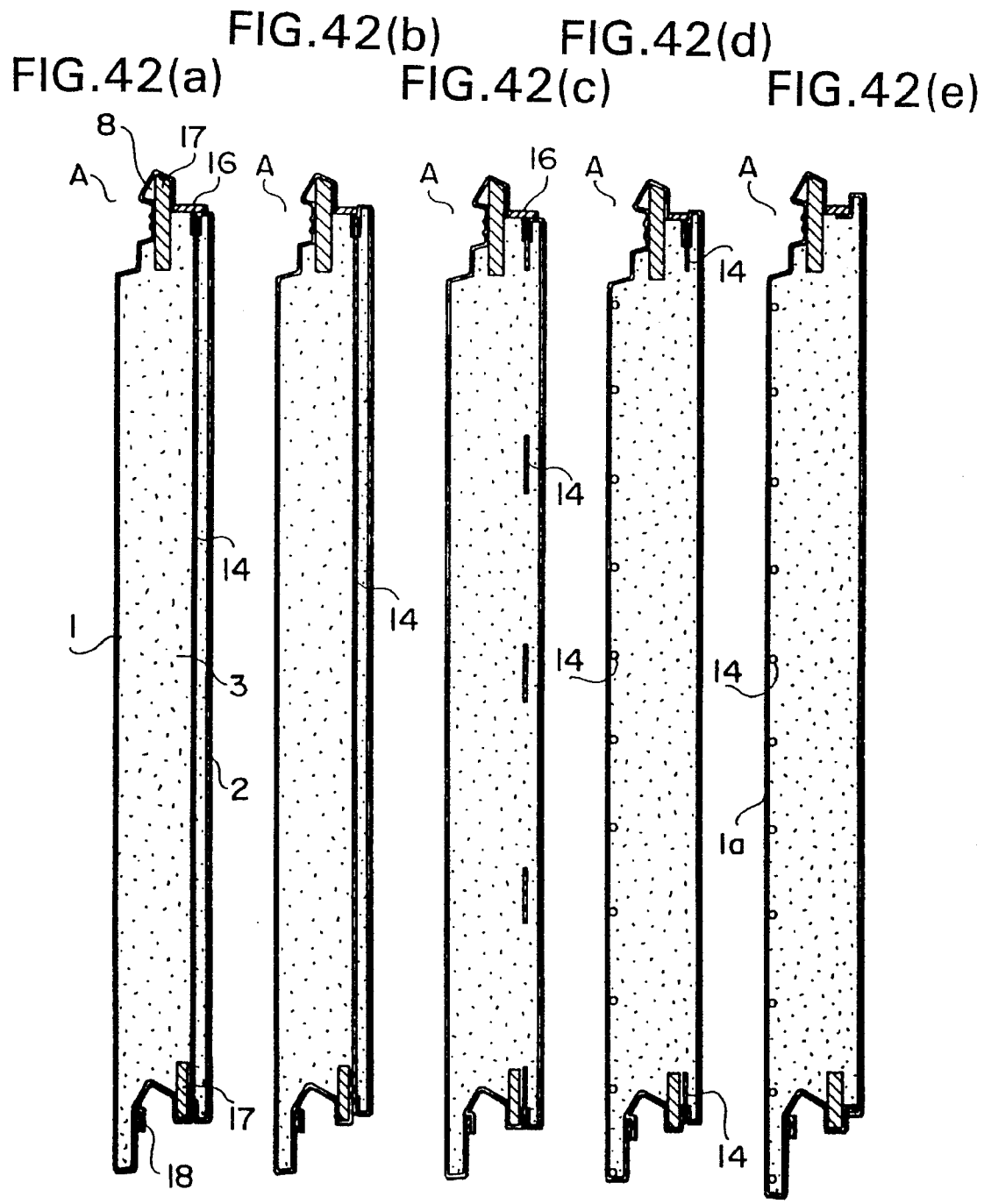

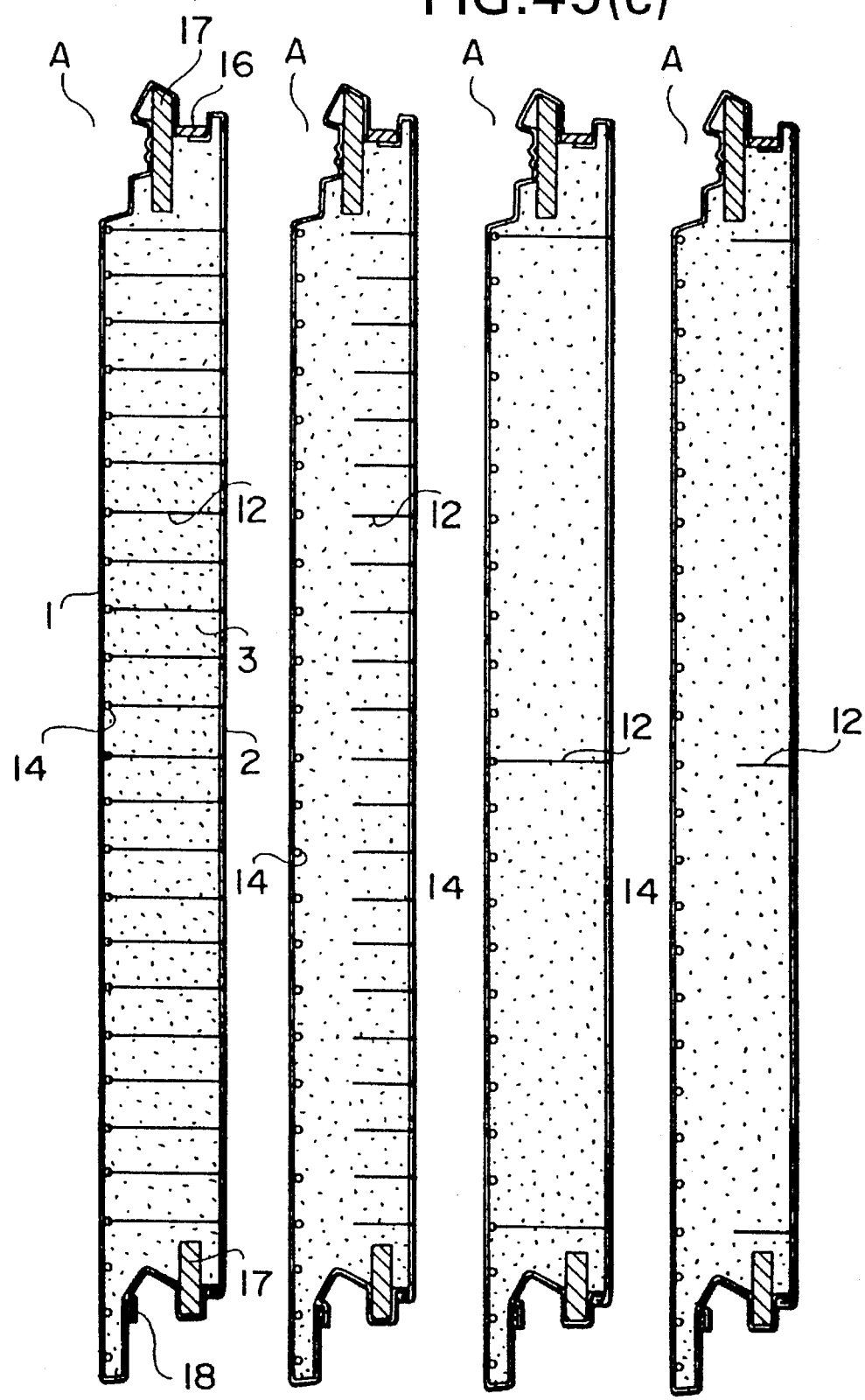

SANDWICH PANEL HAVING INTERNAL GAS DISCHARGE MEMBER

BACKGROUND OF THE INVENTION

1. Field of the Invention

The present invention relates to a sandwich panel which is effectively usable as a material for interior walls, exterior walls, roofs, ceilings, floors, partitions, fireproofing doors, etc. of buildings, and which does not suffer deformation such as swelling, warping or the like after it is manufactured and has excellent mechanical strength.

2. Description of Related Art

There have been hitherto proposed and put on the market various sandwich-type composite panels (hereinafter referred to as "sandwich panel") each of which basically has a sandwich structure that a core member formed of synthetic resin foam is integrally sandwiched between a front surface member and a back surface member. However, these sandwich panels, particularly sandwich panels whose core members are manufactured by an injection molding method of injecting liquid or particle material, have the following problem. That is, when the core member is formed of synthetic resin foam such as phenol foam, polyurethane foam, polyisocyanurate foam or the like, the surface of a sandwich panel suffers deformation such as swelling, warping or the like with time lapse due to internal gas such as unreacted components of those components which are used to form the core member, surplus undesired gas components which are produced through a chemical reaction for forming the core member (for example, chlorine gas, carbon dioxide, methylene chloride, formaldehyde, steam, or hydrogen) or the like, so that the external appearance of a facing is greatly damaged due to the deformation (swelling, warping or the like).

Particularly in a case where phenol resin raw liquid, acidic hardening agent and forming agent are mixed with each other and injected to form phenol foam raw material (resol type) for the core member through a foaming reaction, the condensation water of 10 wt % is produced through the reaction and trapped in the phenol foam. The trapped water is steamed in a produced panel due to variation of an outside temperature or the like during a foster period of the sandwich panel or after a panel securing work is executed, and remains as gas in the core member, in a gap between the core member and each of the front and back surface members of the sandwich panel because there is no leak path through which the internal gas thus produced is discharged to the outside of the panel. Therefore, the gas swelling is liable to occur between the core member and each of the front and back surface members of the sandwich panel, the front surface member and/or back surface member is liable to warp, and/or the mechanical strength of the panel is lowered, so that the external appearance of the sandwich panel and the mechanical strength thereof are varied with time lapse.

Furthermore, in the sandwich panel thus constructed, the front surface member and the back surface member are drawn toward a heating side due to the difference in thermal conductivity therebetween and thus they are greatly deformed in different directions. This deformation causes a gap at a link portion between sandwich panels, and heat and flame leaks to the opposite side through the gap. Therefore, these panels cannot pass a fireproofing construction one-hour test of JIS-A-1304.

Still furthermore, a sandwich panel which is obtained by merely sandwiching a phenol foam body serving as the core member between the front surface member and the back surface member is weak in mechanical strength because its core member is formed of synthetic resin foam, and thus it is weak in bending strength and resistance against wind pressure. In addition, a securing pitch of sandwich panels in a securing work becomes short, and thus its workability is low. Furthermore, the adhesive strength between the core member and each of the front and back surface members is weak, and thus the core member and each of the front and back surface members are liable to be peeled off from each other particularly at the end portions thereof due to a slight impact. The undesired (surplus) gas, etc. as described above are liable to occur particularly in a high-temperature midsummer (a season when the front surface member is humidified).

SUMMARY OF THE INVENTION

An object of the present invention is to provide a sandwich panel (composite panel) in which undesired surplus gas, etc. produced in a core member can be discharged through gas-permeable members to prevent deformation such as swelling, warping or the like of a facing of the sandwich panel for a long time, so that the external appearance of the facing of the sandwich panel is not damaged.

Another object of the present invention is to provide a sandwich panel (refractory panel) which is greatly improved in mechanical strength, fireproofing and holding power, so that the panel can pass a fireproofing construction one-hour test of JIS-A-1304.

In order to attain the above object, according to a first aspect of the present invention, a sandwich panel which is formed by sandwiching a core member of synthetic resin foam (plastic foam) between a front surface member and a back surface member into an unified body is characterized in that plural gas-permeable members are provided at at least one of the inside of the core member, the boundary between the core member and the front surface member of the sandwich panel and the boundary between the core member and the back surface member of the sandwich panel, whereby internal gas occurring in the core member is discharged through the gas-permeable members to the outside of the sandwich panel.

According to a second aspect of the present invention, a sandwich panel comprises a refractory panel which is formed by sandwiching a core member of synthetic resin foam (plastic foam) between a front surface member and a back surface member into an unified body, and it is characterized in that inorganic boards are formed at male-type and female-type link portions thereof, and plural gas-permeable members are provided at least one of the inside of the core member, the boundary between the core member and the front surface member of the refractory panel and the boundary between the core member and the back surface member of the refractory panel, whereby internal gas such as surplus gas components such as plastic foam, compensation water, etc. which are generated in the core member are discharged through the gas-permeable members to the outside of the refractory panel.

In the sandwich panel (the composite panel or the refractory panel) as described above, the gas-permeable members are preferably arranged in a longitudinal direction of the panel.

In the sandwich panel (the composite panel or the refractory panel) as described above, microgasholes each having a holding piece may be formed at the back surface member side of the core member so as to extend toward the inside of the core member (and preferably intercommunicate with each of the gas-permeable members), whereby the gas produced in the core member can be more efficiently discharged through the gas-permeable members and the microgasholes to the outside of the panel.

Furthermore, in the sandwich panel (the composite panel or the refractory panel) as described above, a gas-permeable waterproofing sheet may be laminated on the surface of the back surface member of the panel to prevent water to invade into the core member through the surface of the panel without disturbing the discharge of the surplus gas, etc. through the microgasholes.

Still furthermore, in the sandwich panel (the composite panel or the refractory panel) as described above, the gas-permeable members as described above may be formed of string-shaped hole forming members which are embedded in the core member or provided at the boundary between the core member and at least one of the front and back surface members in a longitudinal direction and/or in a lateral direction of the panel, the string-shaped members which are dissolved or contracted with time lapse to function as gas discharge holes (passes) through which the internal gas such as the undesired gas, etc. produced in the core member with time lapse are discharged to the outside of the panel, whereby the original strength of the panel can be kept and the external appearance of the facing of the panel can be prevented from being damaged.

BRIEF DESCRIPTION OF THE DRAWINGS

FIG. 7A shows a lattice arrangement of the gas-permeable members, and FIG. 7B shows another lattice arrangement of the gas-permeable members in which a gas-permeable member array is further disposed between neighboring gas-permeable member arrays of FIG. 7A;

FIGS. 12(a)–12(e) are cross-sectional views showing other modifications of the sandwich panel according to the first embodiment;

FIGS. 14(a)–14(e) are cross-sectional views showing other modifications of the sandwich panel according to the first embodiment;

FIGS. 18(a)–18(d) are cross-sectional views showing modifications of the refractory panel according to the second embodiment;

FIGS. 19(a) to 19(e) are cross-sectional views showing modifications of the refractory panel according to the second embodiment;

FIGS. 20(a) to 20(e) are cross-sectional views showing modifications of the refractory panel according to the second embodiment;

FIGS. 30(a)–30(f) are cross-sectional views showing various sandwich panels in which microgasholes and gas-permeable members are formed;

FIGS. 32(a)–32(d) and 33(a)–33(d) are cross-sectional views showing refractory panels in which microgasholes and gas-permeable members are formed;

FIGS. 38A and 38B are perspective views showing a sandwich panel (composite or refractory panel) according to a fifth embodiment of the present invention in which hole forming members are provided as gas-permeable members;

FIGS. 40(a)–41(e) show other embodiments of the hole forming member formed in the sandwich panel;

FIGS. 42(a)–42(e) and 43(a)–43(d) are cross-sectional views of sandwich panels in which hole forming members are formed;

FIGS. 45(a)–45(d) and 46(a)–46(d) are cross-sectional views showing sandwich panels in which the hole forming members and blind holes are formed.

DETAILED DESCRIPTION OF THE DRAWINGS

Preferred embodiments according to the present invention will be described hereunder with reference to the accompanying drawings.

Figure 1A:
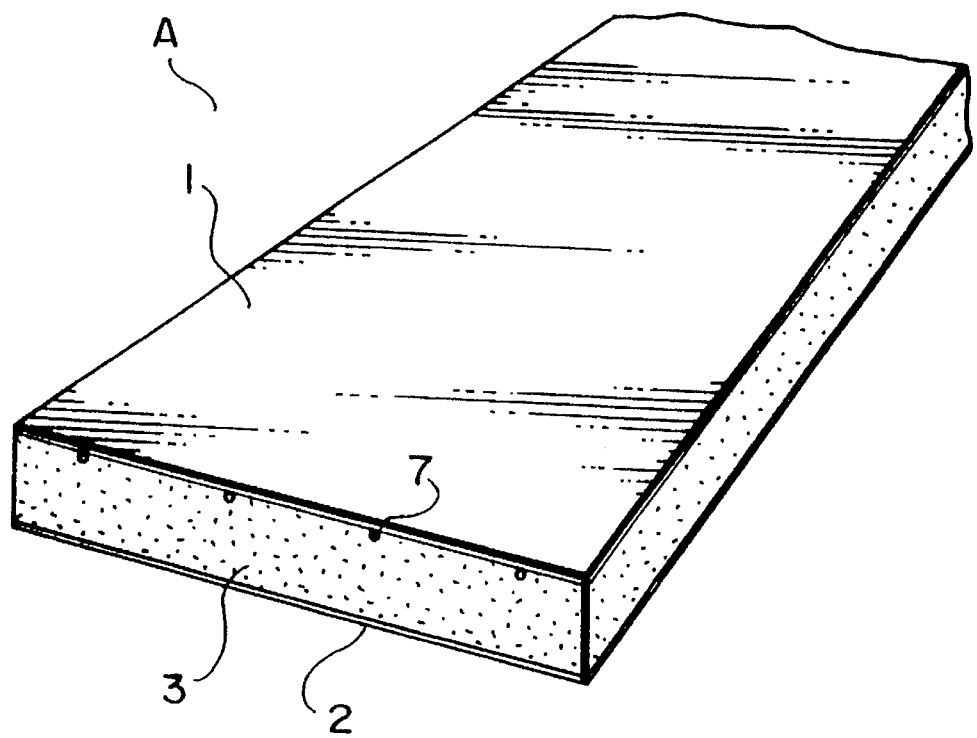
FIG. 1A is a perspective view showing a first embodiment (composite panel) of a sandwich panel according to the present invention.
Figure 1B:
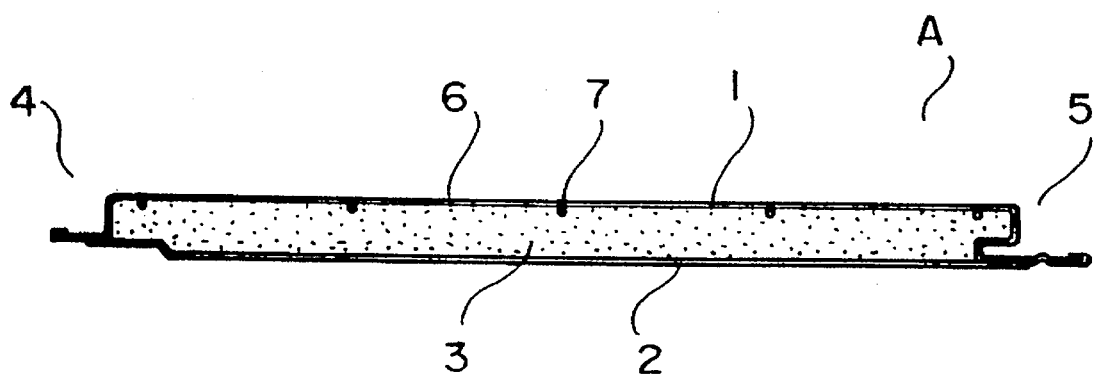
FIG. 1B is a cross-sectional view of the sandwich panel of FIG. 1A.

First, a sandwich panel A according to a first embodiment of the present invention will be described. In this embodiment, a composite panel is used as the sandwich panel A. FIGS. 1A is a perspective view showing a part of the sandwich panel A of the first embodiment of the present invention, and FIG. 1B is a cross-sectional view of the whole construction of the sandwich panel A shown in FIG. 1A. As shown in FIG. 1A, the sandwich panel A has a sandwich structure that a core member 3 formed of synthetic resin foam is sandwiched between a front surface member 1 and a back surface member 2. As shown in FIG. 1B, the sandwich panel A comprises a longitudinal metal panel, a metal sizing or the like which includes the front and back surface members 1 and 2 formed of longitudinal thin plates, the core member 3, a male-type link portion 4 which is formed at one end of the panel in the width direction, a female-type link portion 5 which is formed at the other end of the panel, a facing 6 formed on the front surface member 1, and gas-permeable members 7 which are formed at least one of the following positions: inside the core member 3, at the boundary between the core member 3 and the front surface member 1 and at the boundary between the core member 3 and the back surface member 2.

Each of the front and back surface members 1 and 2 is produced by shaping one kind of metal thin plate such as iron, aluminum, copper, stainless, titan, aluminum/zinc alloy plated steel plate, enamelled steel plate, clad steel plate, laminated steel plate (vinyl chloride steel plate or the like), sandwiched steel plate (damping steel plate or the like) or the like into a desired shape using a roll forming method, a press forming method, an extrusion molding method or the like, or by shaping inorganic material into any desired shape using an extrusion molding method, a press forming method, an autoclave foster shaping method or the like, or by laminating at least one of aluminum deposition paper, asbestos paper, kraft paper, asphalt felt, metal foil (Al, Fe, Pb, Cu), synthetic resin sheet, rubber sheet, cloth sheet, gypsum paper, aluminum hydroxide paper, glass fiber non-woven fabric, etc., or by conducting a waterproof treatment or a flameproofing treatment on the above materials and shaping into a sheet-shaped member.

The core member 3 is formed of synthetic resin foam such as polyurethane foam, polyisocyanurate, phenol foam, vinyl chloride foam, polyethylene foam, polystyrene foam, urea foam or the like. Particularly when the core member is formed of phenol foam, resol type phenol raw liquid and acidic hardening agent are mixed with each other, injected onto the back surface side of the front surface member 1 or back surface member 2, and heated to induce a foaming reaction, thereby unifying the core member with the front surface member 1 or the back surface member 2.

At least one of various kinds of flameproofing materials such as light-weight aggregate (perlite particles, glass beads, gypsum slag, talc, zeolite having absorption capability, shirasu balloon or the like), fibrous material (glass wool, rock fiber, carbon fiber, graphite or the like), endothermic agent (aluminum hydroxide or the like), etc. may be added by 5 to 300 parts by weight to improve fireproofing and fire-protecting properties.

Each of the gas-permeable members 7 which are formed on the back surface of the front surface member 1 is formed of gas-permeable material such as a kite string or the like. After the core member 3 is formed, internal gas containing surplus undesired gas components (chlorine, carbon dioxide, methylene chloride, formaldehyde, steam, hydrogen) is generated through chemical reactions in the core member 3 due to residual acidic components of the hardening agent or foaming agent used for the core member, and compensation water is also generated through the chemical reactions. The gas-permeable members 7 are used to discharge the internal gas such as the surplus undesired gas components, the compensation water, etc. therethrough from the cut end (sectional) portion of the sandwich panel A to the outside of the panel A. Therefore, the sandwich panel A after manufactured suffers no deformation such as swelling or warping due to the internal gas on the back surface thereof, and also it has strong mechanical strength and excellent fireproofing property. Of course, the gas-permeable members may be provided not only at the front surface member side of the core member 3, but also at the intermediate portion of the core member 3, or at the back surface member side of the core member 3, or they may be arranged in the form of plural laminated layers.

Figure 2:
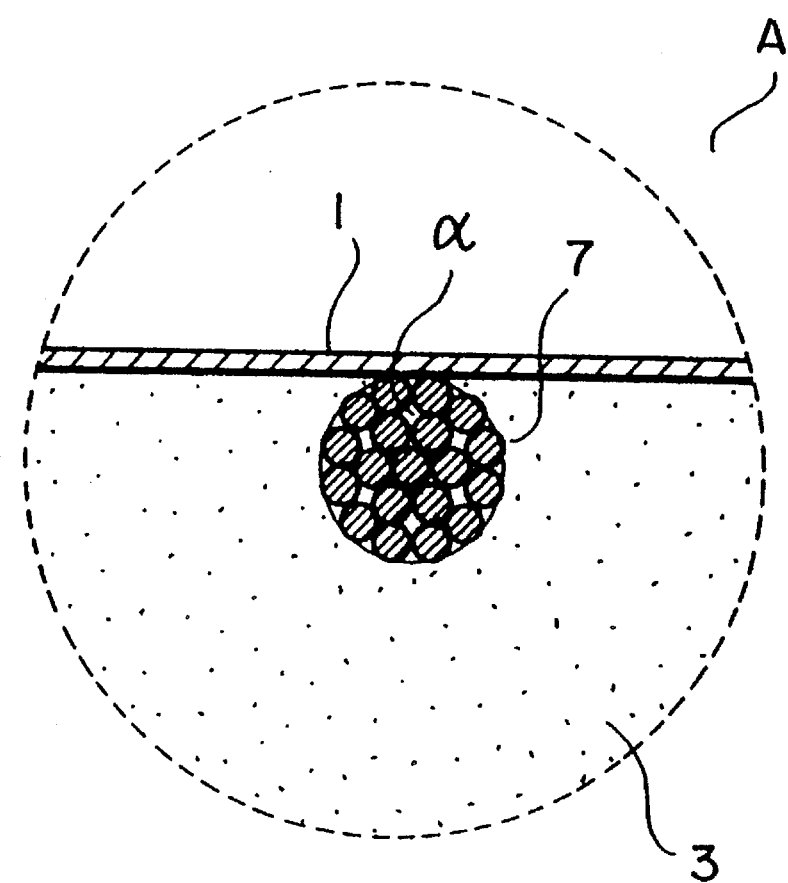
FIG. 2 is an enlarged cross-sectional view showing a gas-permeable member which is used for the sandwich panel of the first embodiment.
Figure 3A:
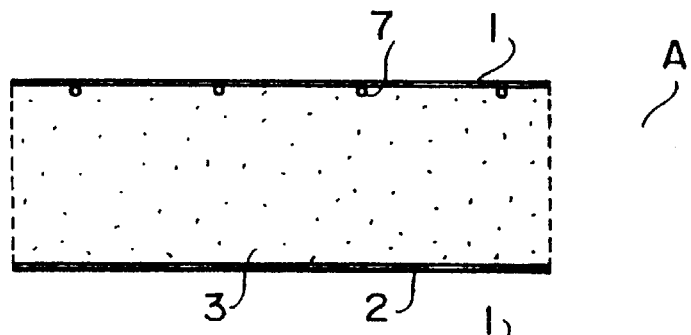
FIGS. 3A to 3F show various arrangements of the gas-permeable members used for the sandwich panel according to the first embodiment.
Figure 3B:
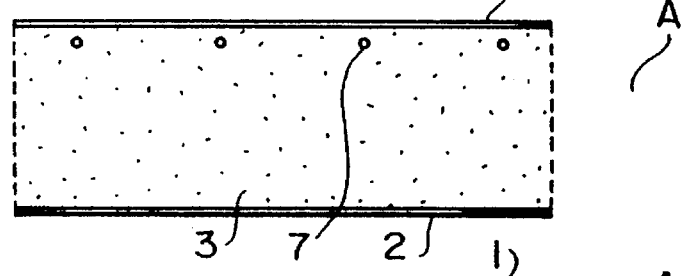
Figure 3C:
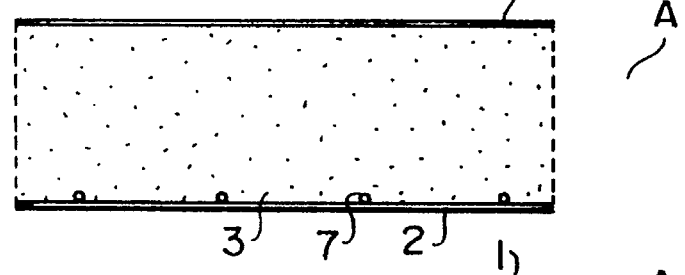
Figure 3D:
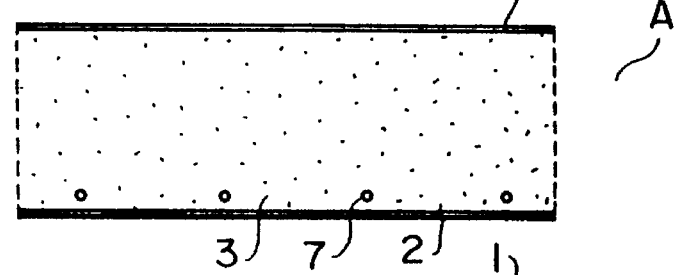
Figure 3E:
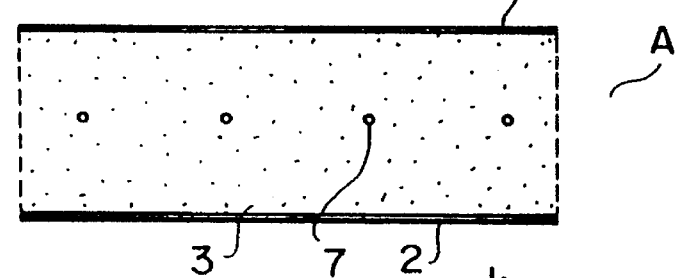
Figure 3F:
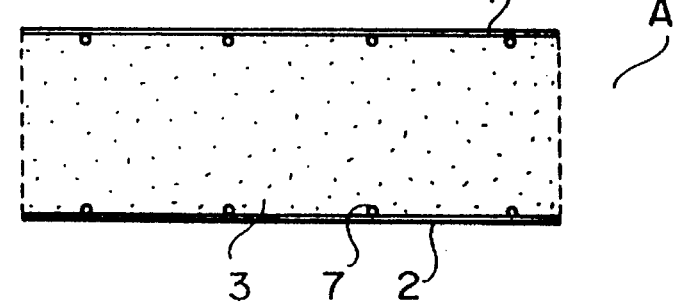
Figure 4A:
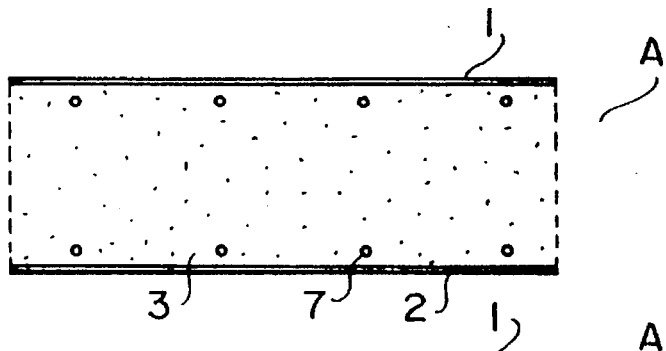
FIGS. 4A to 4F show other arrangements of the gas-permeable members used for the sandwich panel according to the first embodiment.
Figure 4B:
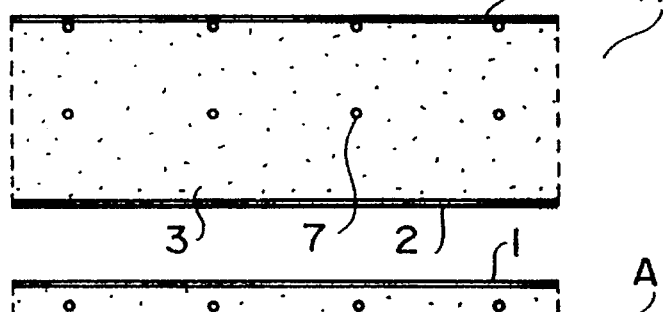
Figure 4C:
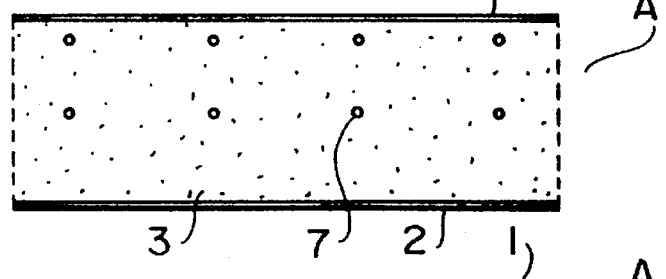
Figure 4D:
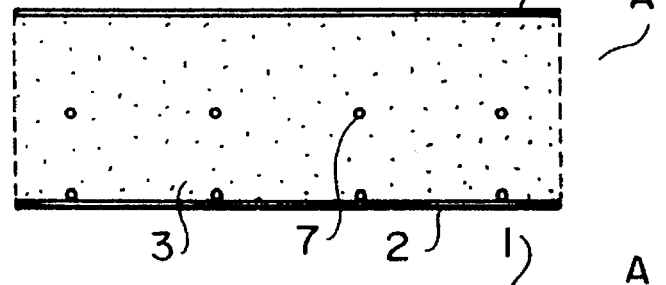
Figure 4E:
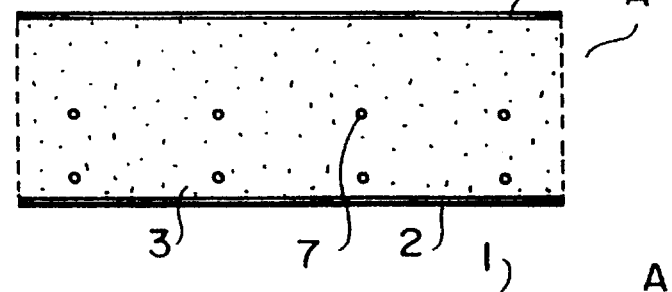
Figure 4F:
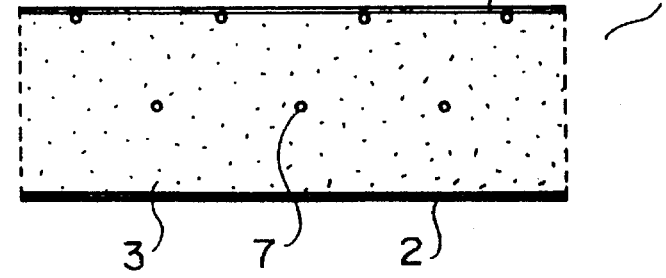
Figure 5A:
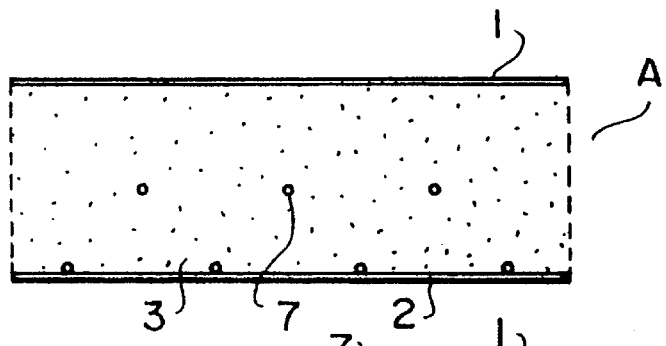
FIGS. 5A to 5F show other arrangements of the gas-permeable members used for the sandwich panel according to the first embodiment.
Figure 5B:
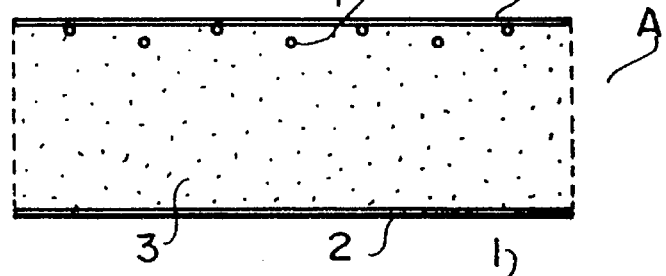
Figure 5C:
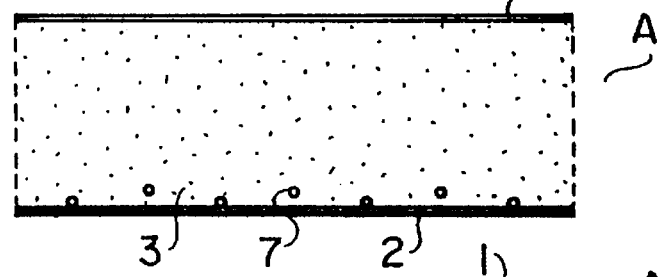
Figure 5D:
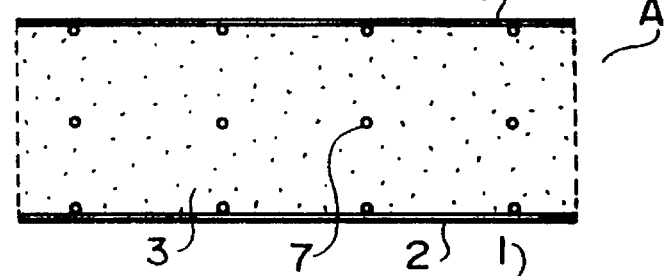
Figure 5E:
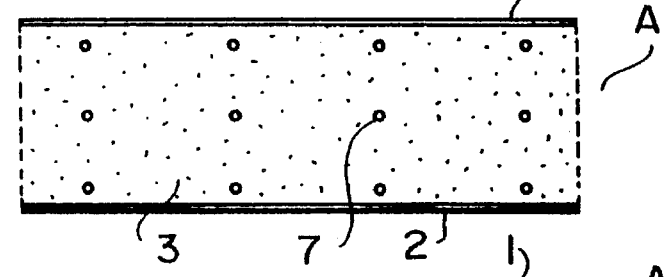
Figure 5F:
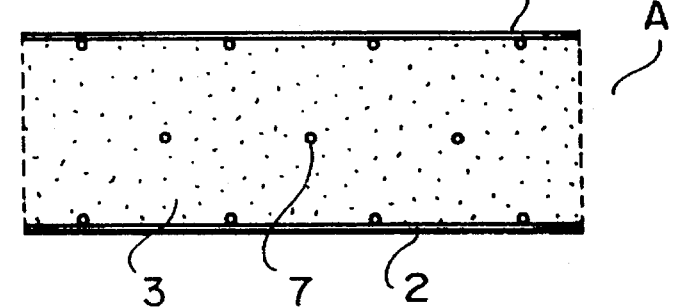
Figure 6A:
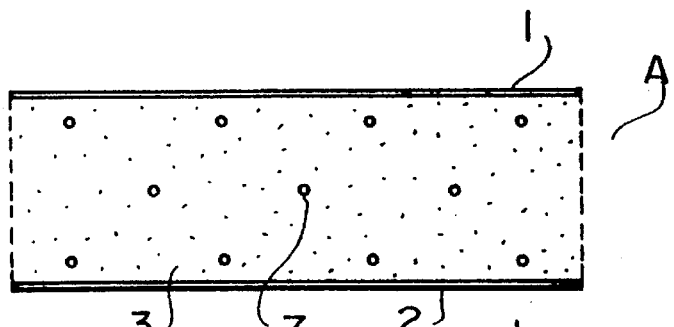
FIGS. 6A to 6E show other arrangements of the gas-permeable members used for the sandwich panel according to the first embodiment.
Figure 6B:
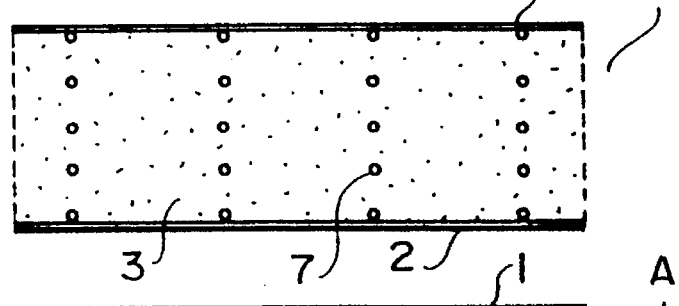
Figure 6C:
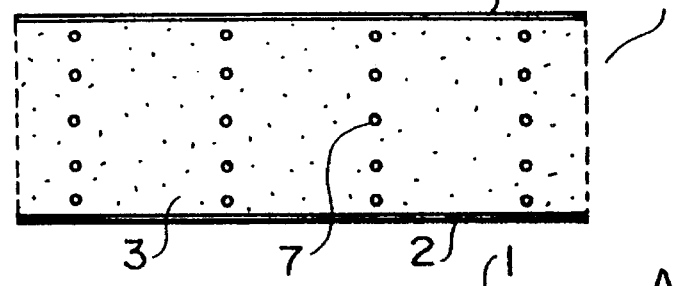
Figure 6D:
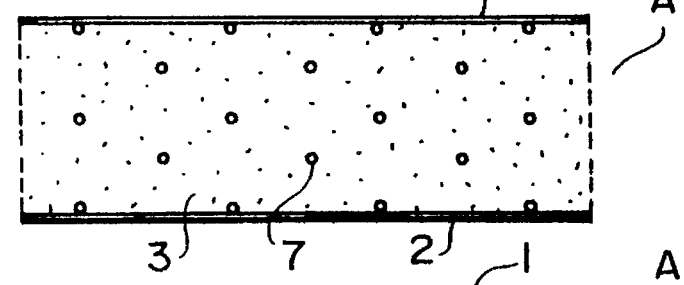
Figure 6E:
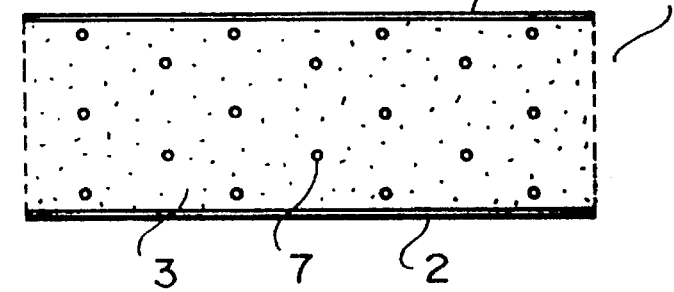
Figure 7A:
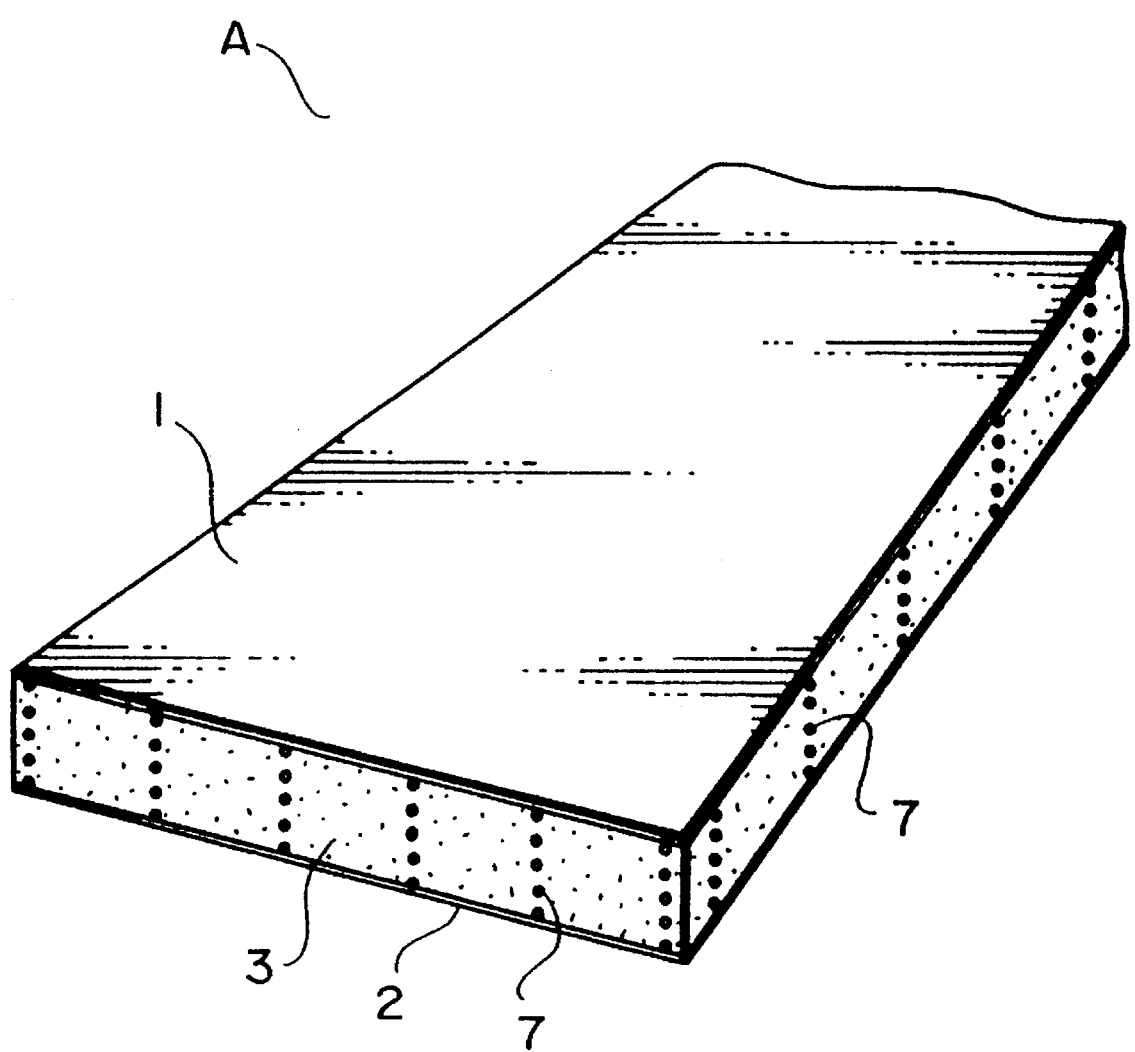
FIGS. 7A and 7B show other arrangements of the gas-permeable members used for the sandwich panel according to the first embodiment, where
Figure 7B:
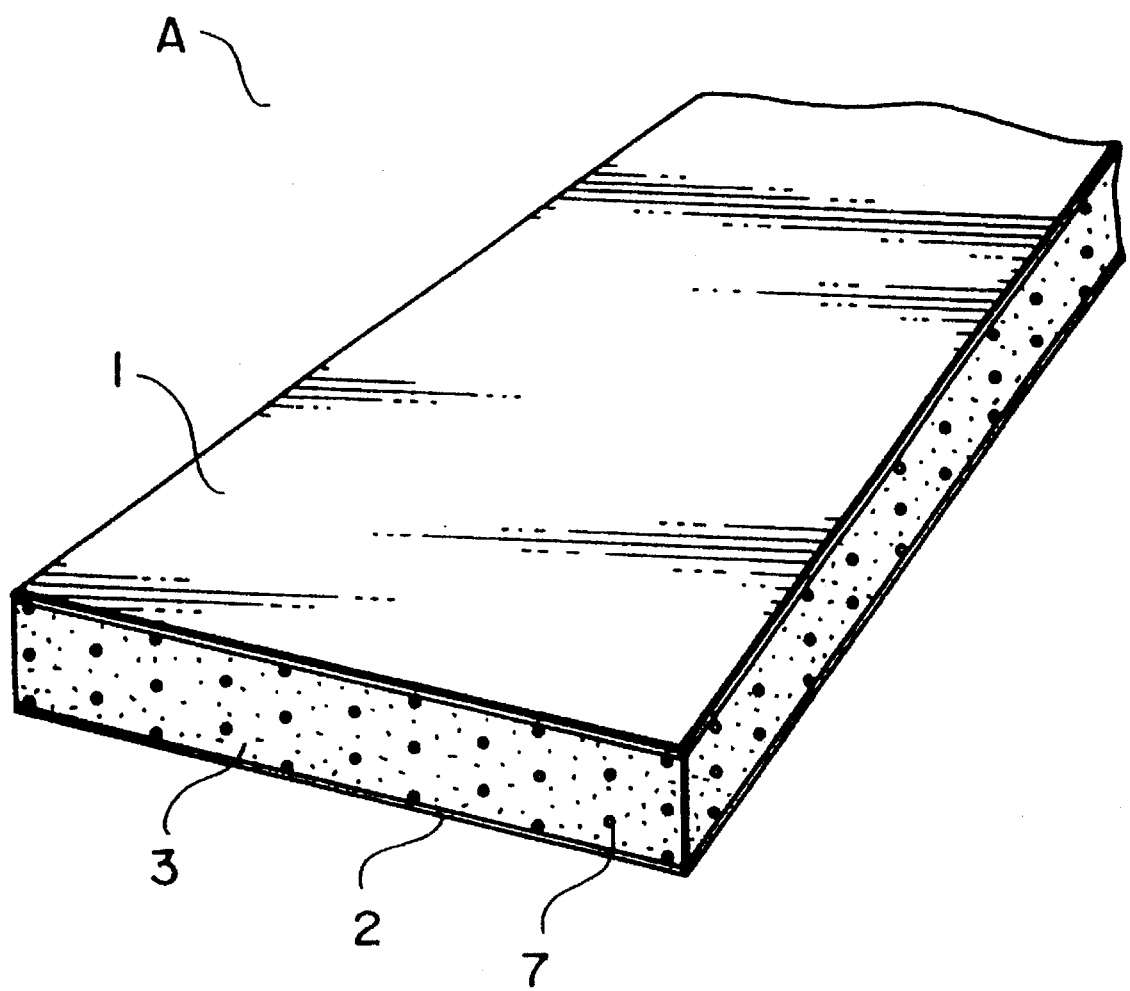
Figure 8A:
FIGS. 8(a)–8(j) show various cross-sectional shapes of each gas-permeable member used for the sandwich panel according to the first embodiment.
Figure 8B:
Figure 8C:
Figure 8D:
Figure 8E:
Figure 8F:
Figure 8G:
Figure 8H:
Figure 8I:
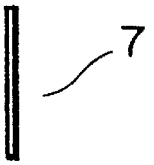
Figure 8J:
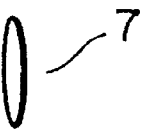
Figure 9A:
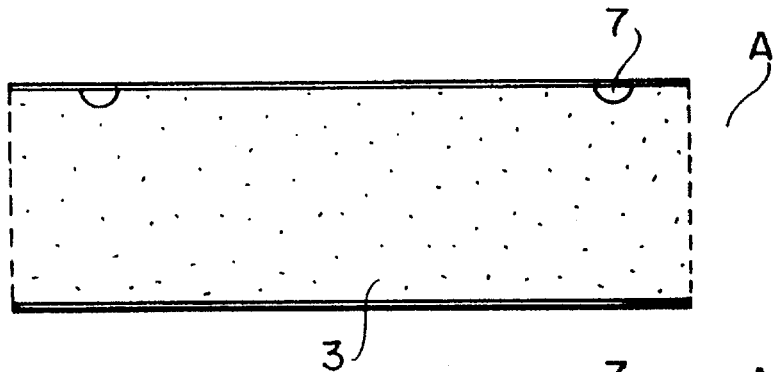
FIGS. 9A to 9E are cross-sectional views showing modifications of the sandwich panel according to the first embodiment.
Figure 9B:
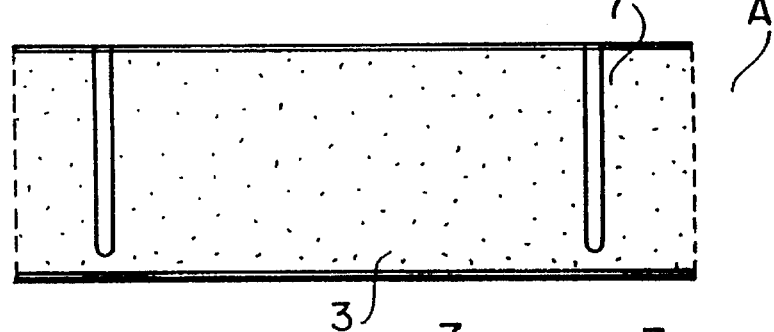
Figure 9C:
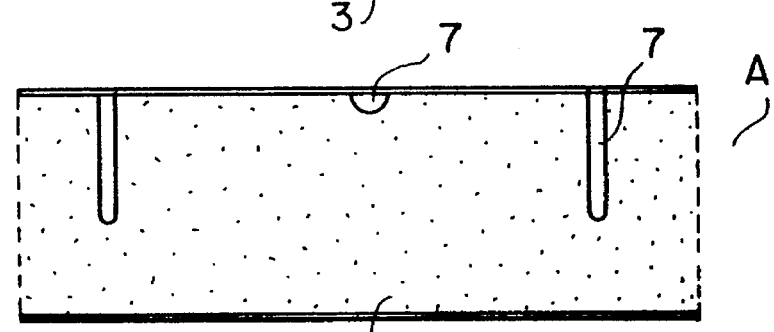
Figure 9D:
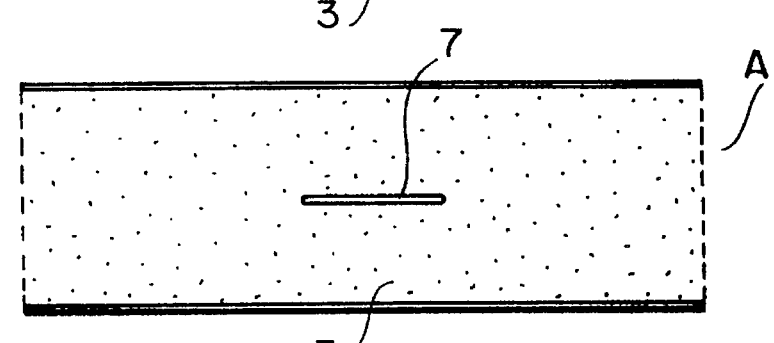
Figure 9E:
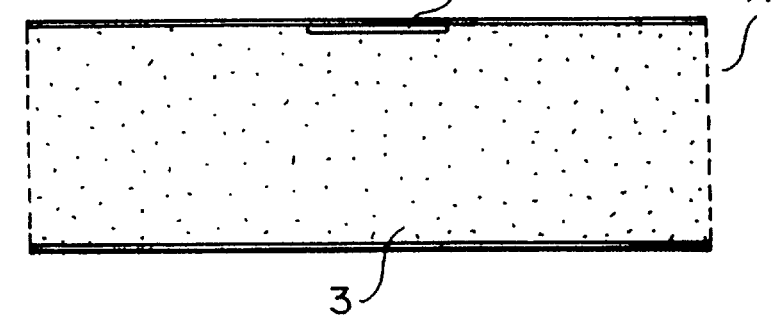

As shown in an enlarge cross-sectional view of FIG. 2, each gas-permeable member 7 forms microgaps α therein, and it may be formed by slenderly stretching and twisting fiber such as cocoon, cotton, hemp, wood or the like (vegetable fiber, animal fiber, synthetic resin fiber or the like). In more detail, each microgap α is designed to intercommunicate with the cut end portion of the sandwich panel A so that the surplus gas components (chlorine, carbon dioxide, methylene chloride, formaldehyde, steam, hydrogen), etc. generated in the core member 3 and gas such as the compensation water, etc. can be discharged to the outside of the panel A. The shape of gas-permeable member 7 may be designed in a string shape, in a net shape, in a rod shape, in a tape shape, in a coil shape or the like.

Furthermore, the gas-permeable member 7 is formed simultaneously with the formation of the core member 3 while inserted in the core member 3, and thus it is embedded in the core member 3. The resin material of the core member 3 does not invade into the gas-permeable member 7, and it is formed so as to surround the outer surface portion of the gas-permeable member 7. Therefore, the continuously extending microgaps α are formed at the central portion of the gas-permeable member 7.

With the core member 3 thus constructed, the sandwich panel A after manufactures suffers no deformation such as swelling, warping or the like due to the internal gas on the front and back surfaces of the sandwich panel A, and also it has high mechanical strength and excellent fireproofing property.

The gas-permeable members 7 may be arranged in the sandwich panel A and shaped as shown in FIGS. 3A to FIG. 9E. That is, FIGS. 3A to 6E show various arrangements of the gas-permeable members 7. FIG. 7A shows a sandwich panel A in which gas-permeable members 7 are arranged in a lattice form, and FIG. 7B shows a sandwich panel A in which a lattice gas-permeable member array is further disposed between neighboring gas-permeable member arrays of the lattice arrangement shown in FIG. 7A. Furthermore, (a) to (j) of FIG. 8 show various cross-sectional shapes of the gas-permeable members 7, and FIGS. 9A to 9E show various longitudinally-sectional shapes of the gas-permeable members 7.

FIGS. 10 to FIG. 14 show various modifications of the sandwich panel A of the first embodiment, in which the gas-permeable members 7 are omitted.

Figure 15A:
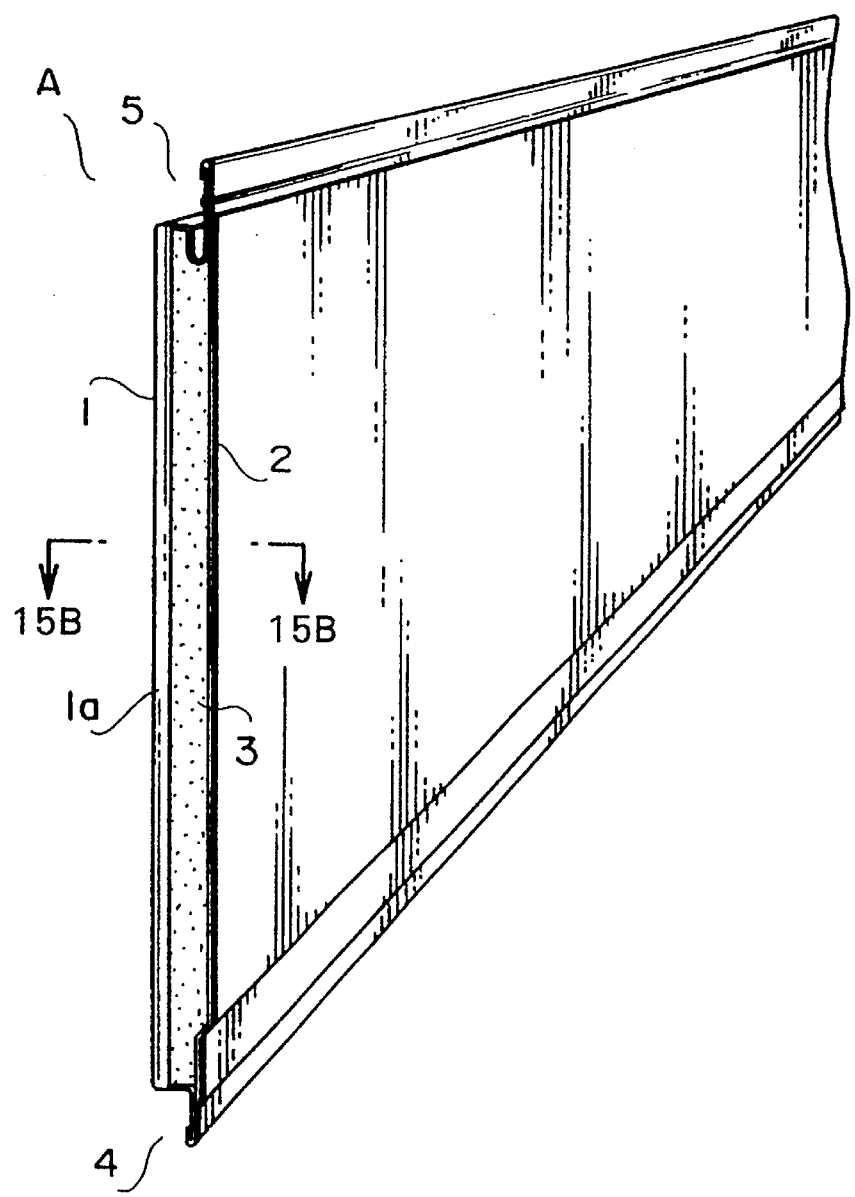
FIG. 15A is a perspective view showing another modification of the sandwich panel.
Figure 15B:
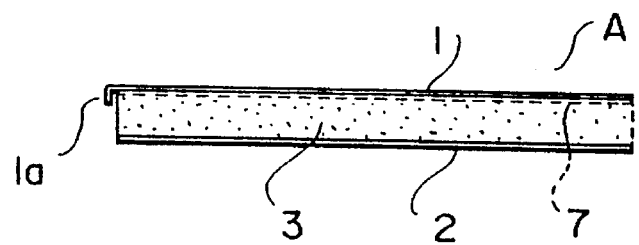
FIG. 15B is a cross-sectional view of the sandwich panel of FIG. 15A.

Furthermore, FIGS. 15A and 15B (which is a 15B—15B line cross-sectional view of FIG. 15A) show the sandwich panel A which is provided with an end face wall 1a at both ends (cut ends) in the longitudinal direction of the sandwich panel A to improve the workability of a vertical jointing portion, the waterproof property and the external appearance of the arrangement.

Figures 10A, 10B, 10C:
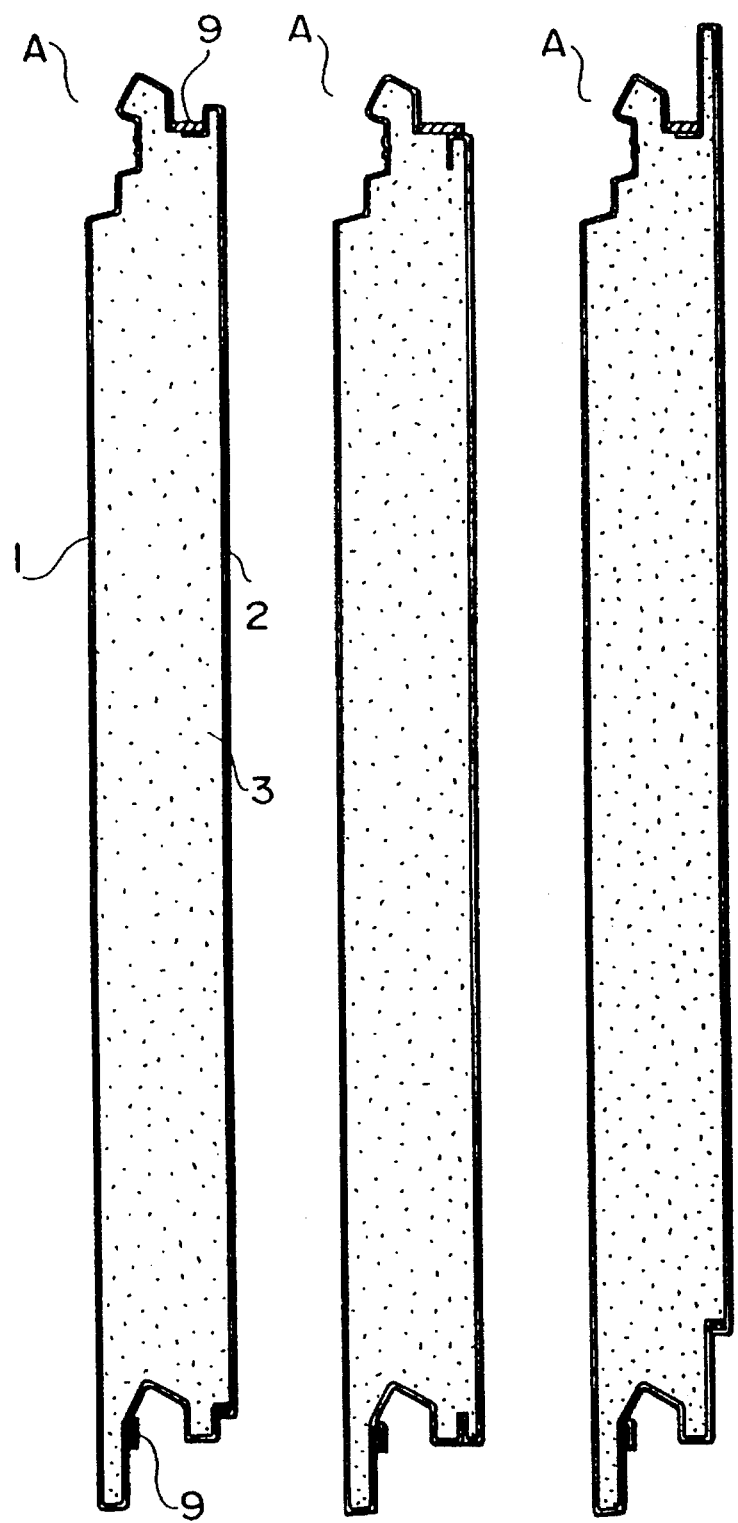
FIGS. 10(a)–10(c) are cross-sectional views showing other modifications of the sandwich panel according to the first embodiment.
Figure 11A:
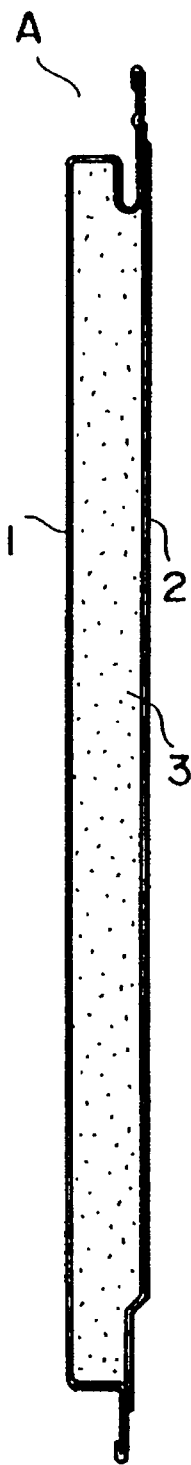
FIGS. 11(a)–11(f) are cross-sectional views showing other modifications of the sandwich panel according to the first embodiment; of the sandwich panel according to the first embodiment.
Figure 11B:
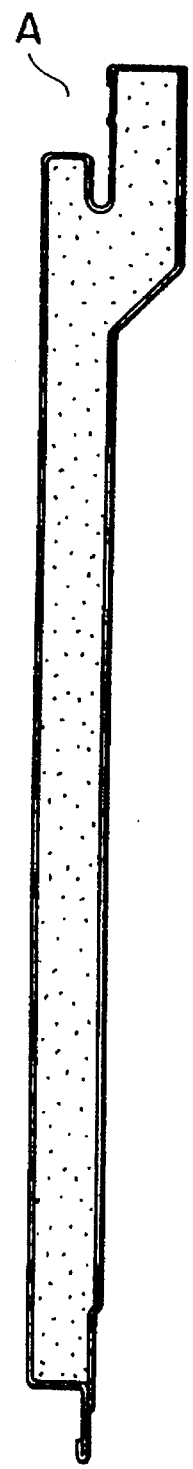
Figure 11C:
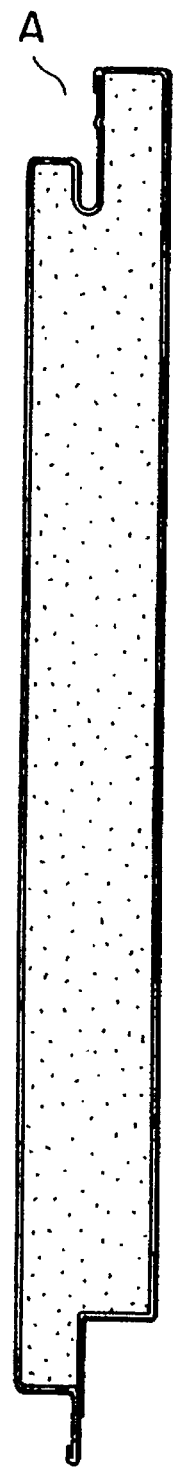
Figure 11D:
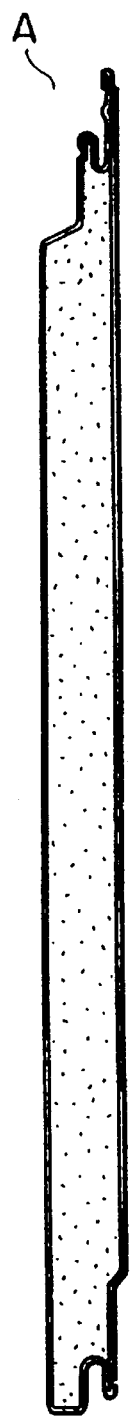
Figure 11E:
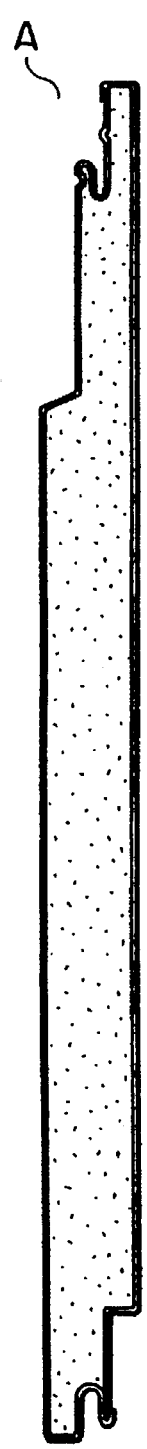
Figure 11F:
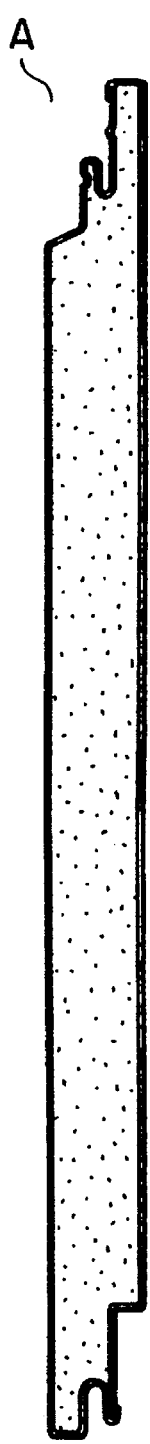
Figure 13A:
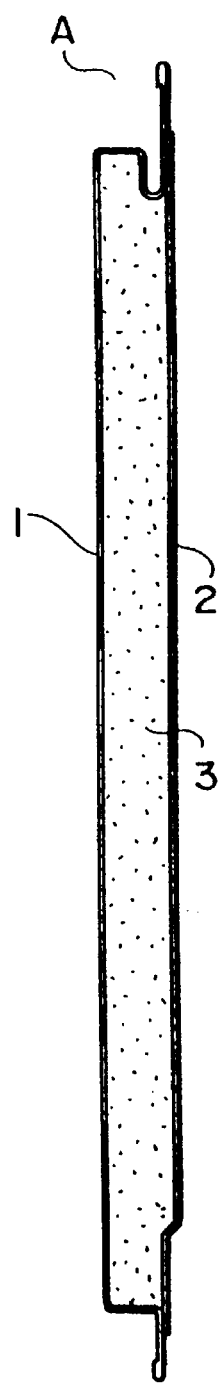
FIGS. 13(a)–13(f) are cross-sectional views showing other modifications of the sandwich panel according to the first embodiment.
Figure 13B:
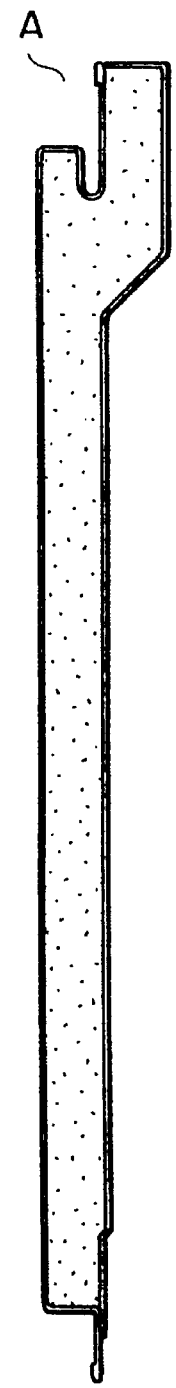
Figure 13C:
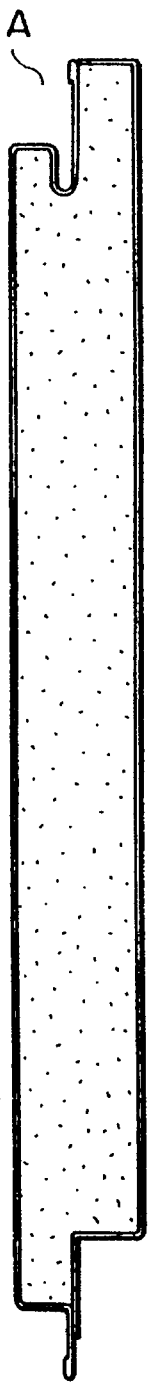
Figure 13D:
Figure 13E:
Figure 13F:

Reference numeral 9 in FIG. 10 represents a packing member, and it is formed of a material which is effective as a waterproof material and a sealing material, such as poly vinyl chloride, chloroprene, chlorosulfonated polyethylene, ethylene propylene, asphalt-impregnated polyurethane, generally-marketed EPM or EPDM, or inorganic packing member such as rock wool felt, ceramic wool or the like.

As described above, the sandwich panel of the first embodiment of the present invention has the following features and effects: (1) the gas-permeable members are formed in the core member, and thus even when the surplus gas, etc. are generated in the core member, the gas-permeable members can efficiently discharge these gas from cut end portion of the sandwich panel to the outside, so that no deformation such as swelling, warping or the like occurs on the facing of the sandwich panel for a long term; (2) the external appearance can be improved; (3) the mechanical strength of the sandwich panel can be improved; (4) productivity (yield) can be improved; and (5) the number of claims can be reduced.

FIGS. 16 to FIG. 24 shows a second embodiment in which the present invention is applied to a refractory panel, that is, the sandwich panel of the first embodiment is a refractory panel. The construction of the refractory panel of this embodiment is substantially identical to that of the sandwich panel as described above, except that plastic foam which mainly functions as heat insulating material, refractory material, adhesive, reinforcing material, buffer material, sound absorbing material, bulking material, weight-lighting material or the like is used as the synthetic resin foam, and an inorganic packing material is used as the packing material to improve the fireproofing property and the gastightness. The elements having the same functions as the first embodiment are represented by the same reference numerals, and the description thereof is omitted.

Figure 16:
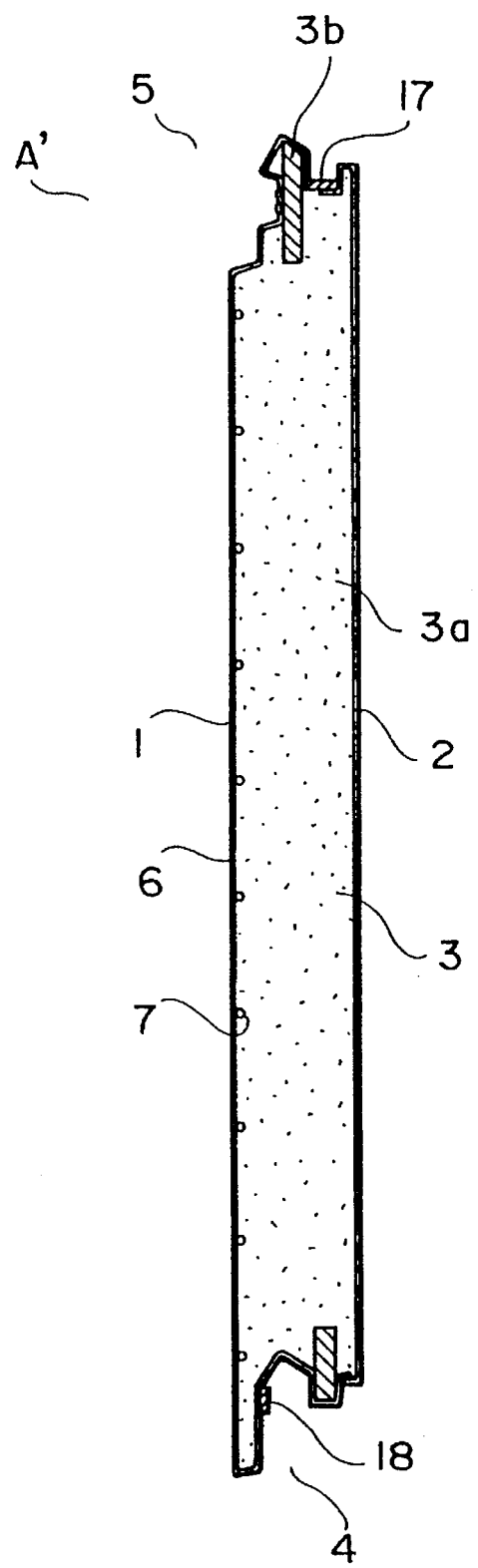
FIG. 16 is a cross-sectional view of a second embodiment in which the present invention is applied to a refractory panel (i.e, the sandwich panel comprises a refractory panel)
Figure 17:
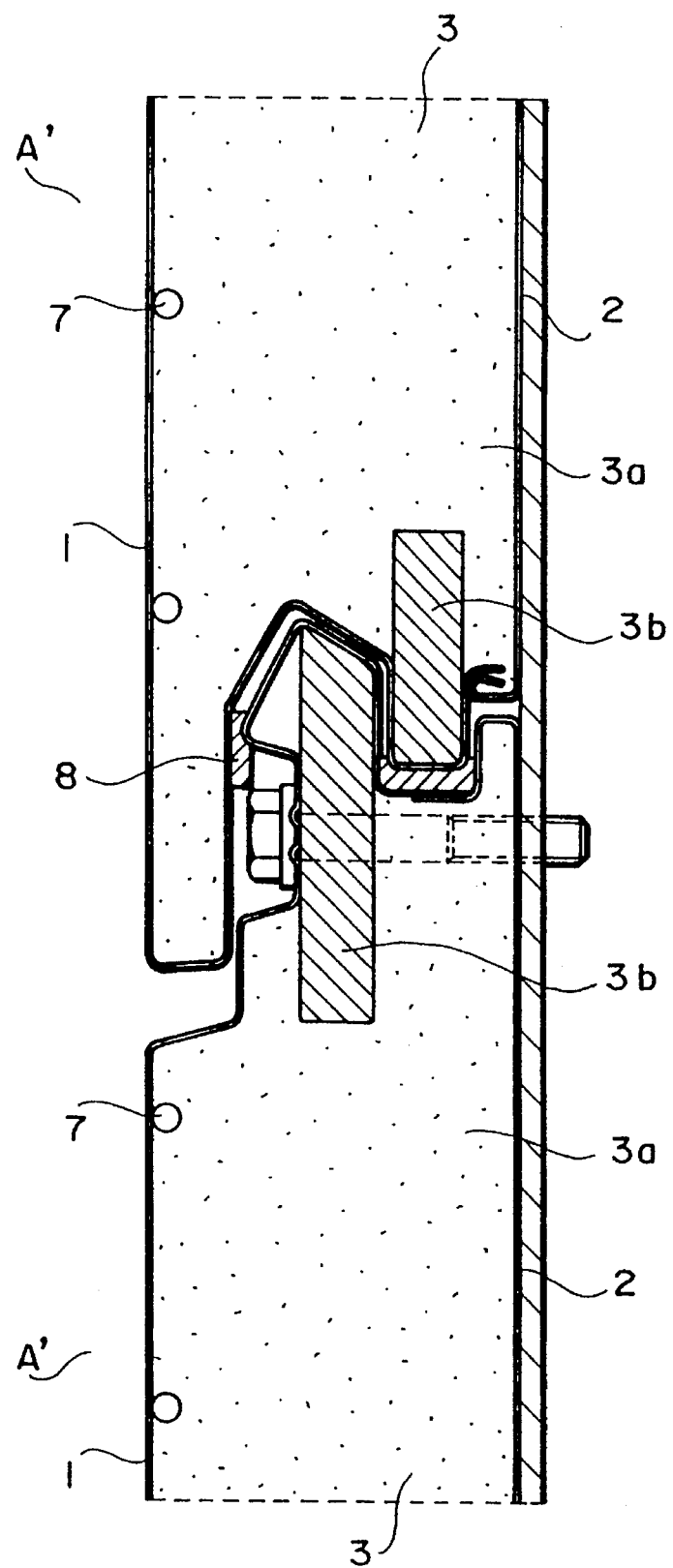
FIG. 17 is cross-sectional view showing a securing method for refractory panels according to the present invention.
Figures 20A, 20B, 20C:
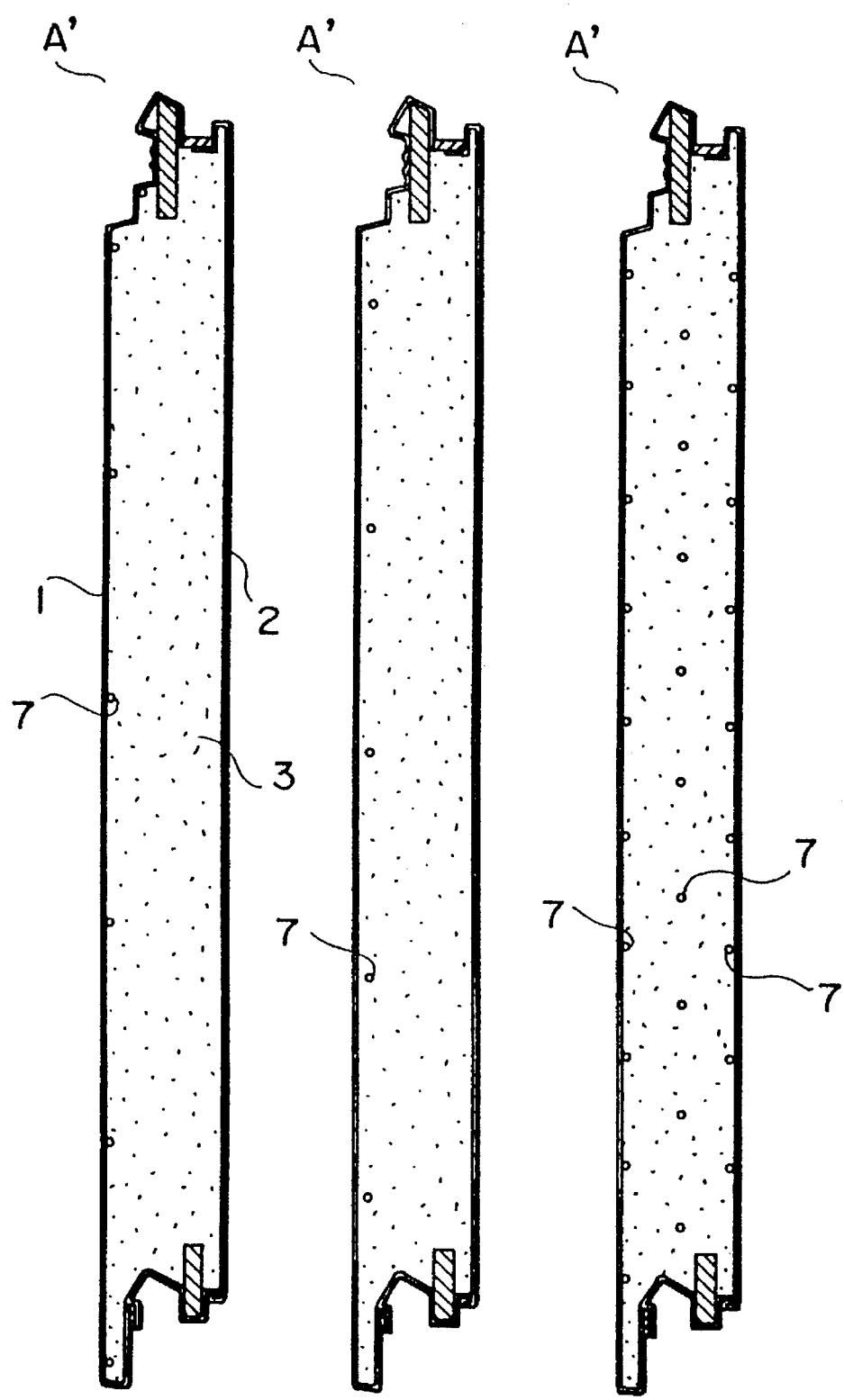
Figure 21A:
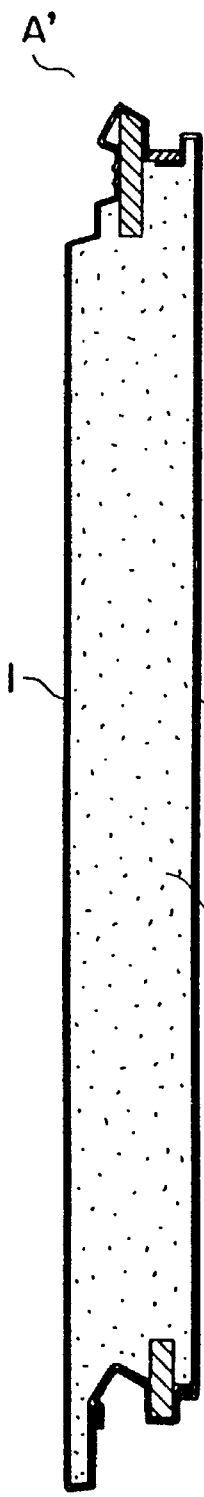
FIGS. 21(a)–21(d) are cross-sectional views showing modifications of the refractory panel according to the second embodiment.
Figure 21B:
Figure 21C:
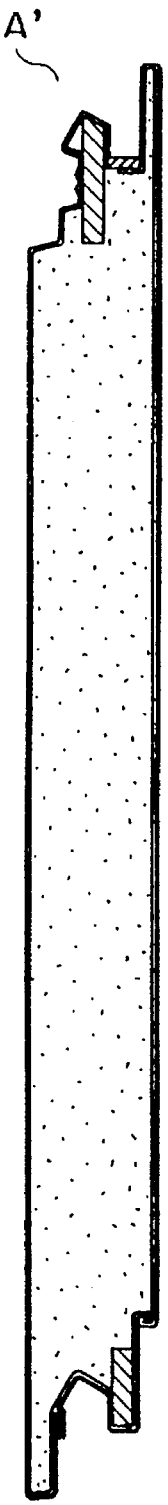
Figure 21D:
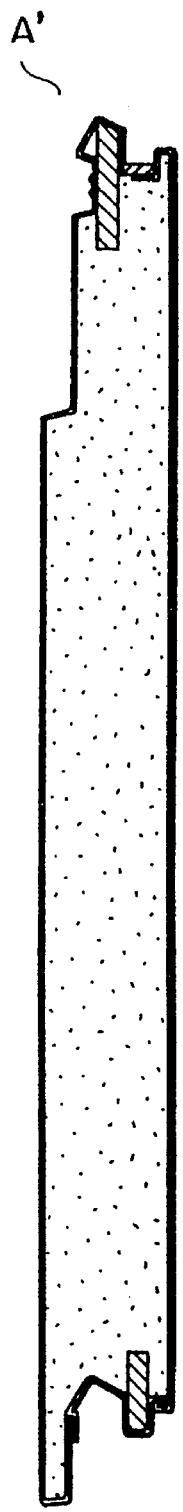
Figure 22A:
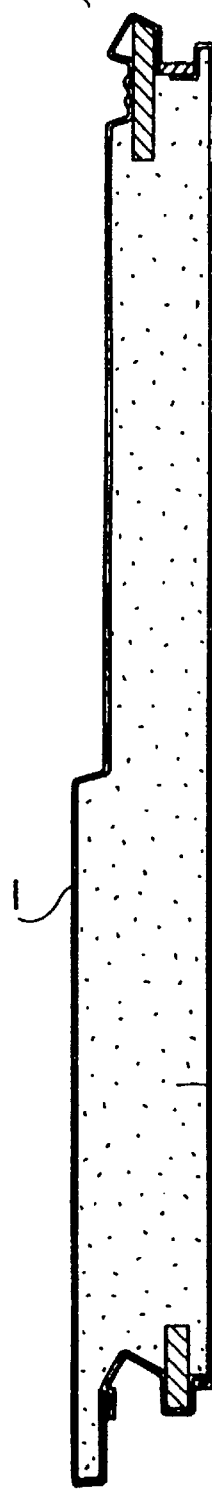
FIGS. 22(a)–22(d) are cross-sectional views showing modifications of the refractory panel according to the second embodiment.
Figure 22B:
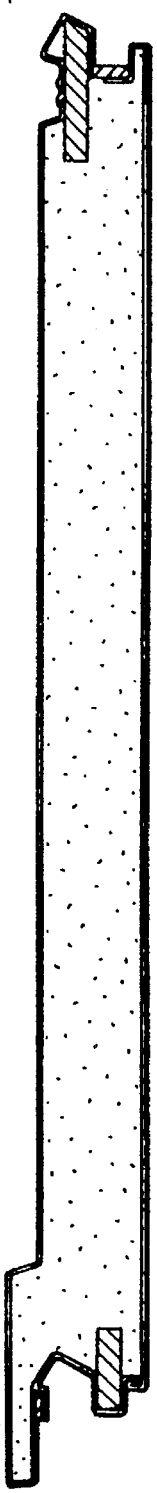
Figure 22C:
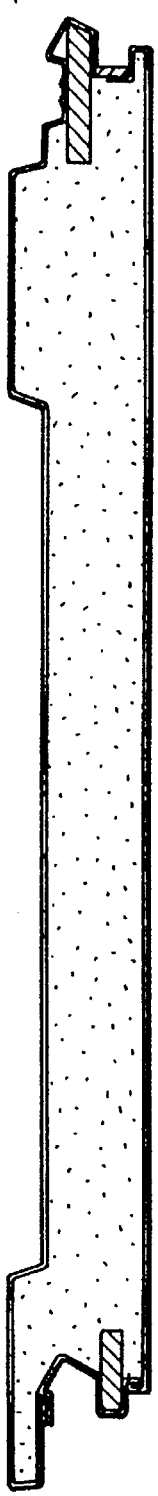
Figure 22D:
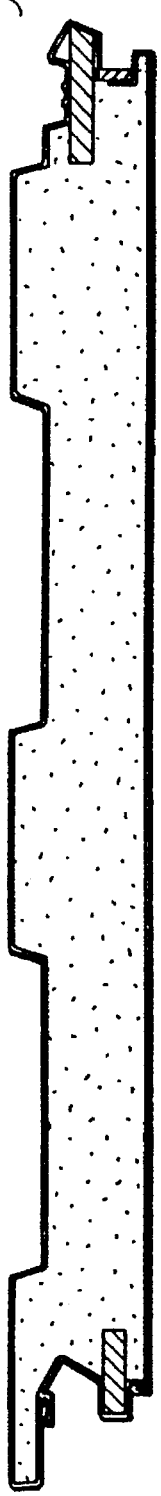

FIG. 16 is a cross-sectional view showing the refractory panel according to the second embodiment of the present invention. Like the first embodiment, the refractory panel A' has the sandwich structure that the core member 3 formed of synthetic resin foam is sandwiched between the front surface member 1 and the back surface member 2, and it comprises the longitudinal metal panel, metal sizing or the like which includes the front and back surface members 1 and 2 formed of longitudinal thin plates, the core member 3, the male-type link portion 4 which is formed at one end of the panel in the width direction, the female-type link portion 5 which is formed at the other end of the panel, the facing 6 formed on the front surface member 1, the gas-permeable members 7 which are formed at least one of the following positions: in the core member 3, at the boundary between the core member 3 and the front surface member 1 and at the boundary between the core member 3 and the back surface member 2, an inorganic packing material 17, and a waterproof packing material 18. FIG. 17 is a cross-sectional view showing a securing state of the refractory panels.

The construction and the material of the surface front member 1 and the back surface member 2 are identical to those of the first embodiment. As shown in FIG. 16, the core member 3 comprises a plastic foam 3a, inorganic boards 3b which are formed at both ends thereof, and plural gas-permeable members 7 which are formed in the core member 3 in the same manner as described above. The plastic foam 3a is formed by mixing resol-type phenol foam with inorganic material such as foaming agent, aluminum hydroxide (Al(OH)$_3$), ammonium polyphosphate, graphite, hardening agent, calcium silicate, calcium carbonate or the like to foam and harden the phenol foam so that the result has a finish density of about 50 to 300 Kg/m$^3$. The resol-type phenol foam (hereinafter referred to as "phenol foam") is mainly manufactured by a continuous foaming method, and it has a higher nonflammable property, a lower fuming property and lower toxicity than other synthetic resin foams (plastic foam). The phenol foam is sandwiched between metal plates to form a metal sizing material, and the metal sizing material thus formed has a fire-preventing performance which can pass the fireprotecting structure test of JIS-A-1301 (fireprotecting test method for timber structure portions of buildings), JIS-A-1302 (fireprotecting test method for nonflammable structure portions of buildings).

Now, assuming that the phenol foam raw liquid of 100 parts by weight is added, the other materials at the following parts by weight are mixed into the raw liquid. The mixing amount of the foaming agent is set to 2 to 50 parts by weight. The foaming agent may be formed of methylene chloride, carbonate (powder) or the like. The mixing amount of aluminum hydroxide is set to 50 to 300 parts by weight. Aluminum hydroxide is effective as flameproofing material, fireproofing material and heat-resisting material, and its water content is equal to 0 to 30% water, its grain size is equal to 10 to 100μ and its purity is 90% or more. The mixing amount of ammonium polyphosphate is set to 1 to 25 parts by weight. It is effective as a reaction adjusting material and a flameproofing material, and its grain size is equal to 30 to 100μ. The mixing amount of graphite is set to 2 to 30 parts by weight, and its effect is as follows. Phenol foam is carbonized when a fire occurs, and thus voids are formed. The voids are filled with the graphite which is expanded due to heat, so that the fireproofing performance can be prevented from being lowered due to thinning. The mixing amount of the hardening agent is set to 10 to 50 parts by weight, and it is formed of an organic phosphate or a mixture of phosphate and PSA.

The inorganic material such as calcium silicate, calcium carbonate or the like is mixed to improve a shape keeping property and a fireproofing property of the plastic foam 30. Furthermore, the inorganic board 3b is used to reinforce the firepreventing property of the link portions as described later, and it is formed of a calcium silicate plate, a calcium carbonate plate, a gypsum board, a perlite cement plate, a rock wool plate, a slate plate, an ALC plate, a PC plate, other inorganic light weight materials, an inorganic light weight foam, or at least one kind of sandwich plate of the above materials, or ultrahigh density resin (ultrahigh density phenol foam or the like). The inorganic board 3b is integrally formed at each of the male-type link portion 4 and the female-type link portion 5.

In the embodiment shown in FIG. 16, the gas-permeable members 7 are formed on the back surface of the front surface member 1, and these members have the same structure as the first embodiment as described above. Furthermore, the gas-permeable members 7 can be also provided in the same arrangements as the first embodiment in the refractory panel.

The inorganic packing member 17 is formed of lock wool felt, ceramic wool or the like, and it functions to prevent a gap from being formed between the link portions at the fireproofing structure test time, thereby intercepting invasion of fire. Therefore, it is mainly effectively used as a fireproofing material and a gastight material.

The waterproof packing member 18 is formed of polyvinyl chloride, chloroprene, chlorosulfonated polyethylene, ethylene propylene, asphalt-impregnated polyurethane, generally-marketed EPM or EPDM, and it is mainly effective as the waterproofing material and the gastight material.

Here, an internal gas pressure measuring test was performed for refractory panels A having the same cross-sectional shape as shown in FIG. 16, one of which was provided with the gas-permeable members 3c (kite strings) and the other of which was provided with no gas-permeable member (no kite string). In both the cases, color steel plates were used as the front surface member 1 and the back surface member 2. The result was that 0.22 Kg/cm$^2$ was measured for the refractory panel having no gas-permeable member while 0.02 Kg/cm$^2$ was measured for the refractory panel having the gas-permeable members (kite strings), and thus it was proved that the internal gas pressure could be reduced by 90% or more. In this test, the measurement was made under a condition that the color steel plate serving as the front surface plate 1 of the tested refractory panel A' was heated to 40° C. to 80° C. because the surplus gas was assumed to occur in midsummer.

The refractory panel of the second embodiment is not limited to the above embodiment, and it is needless to say that the embodiments shown in FIGS. 3A to 7B in which the gas-permeable members 7 are provided in various arrangements, and the various lateral and longitudinal shapes of the gas-permeable members shown in FIGS. 8 and FIGS. 9A to 9E are applicable to the refractory panel of this embodiment.

FIGS. 18A to FIG. 20B show other embodiments of the refractory panel A'. That is, FIGS. 18A to 18D, FIG. 19 and FIG. 20 show various refractory panels in which the arrangement of the gas-permeable members 7 and the number of the gas-permeable members 7 are respectively varied.

Figures 23A, 23B:
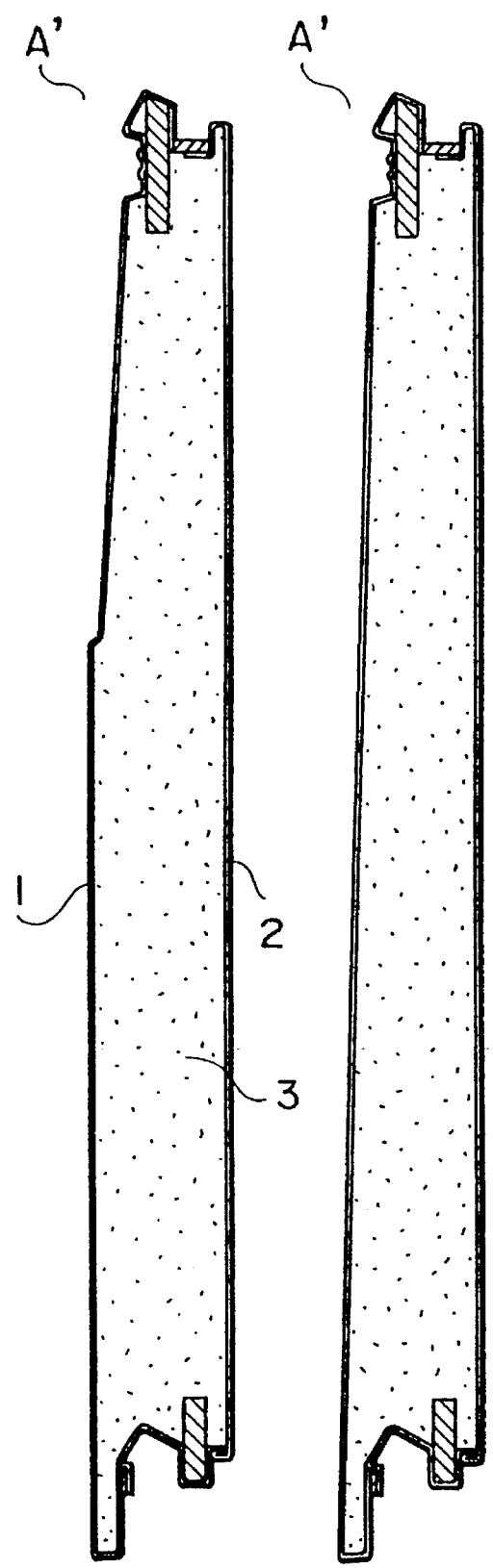
FIGS. 23(a) and 23(b) are cross-sectional views showing modifications of the refractory panel according to the second embodiment.

Furthermore, FIGS. 21, 22 and 23 show other embodiments of the refractory panel, and the gas-permeable members 7 are omitted in these figures.

Figure 24A:
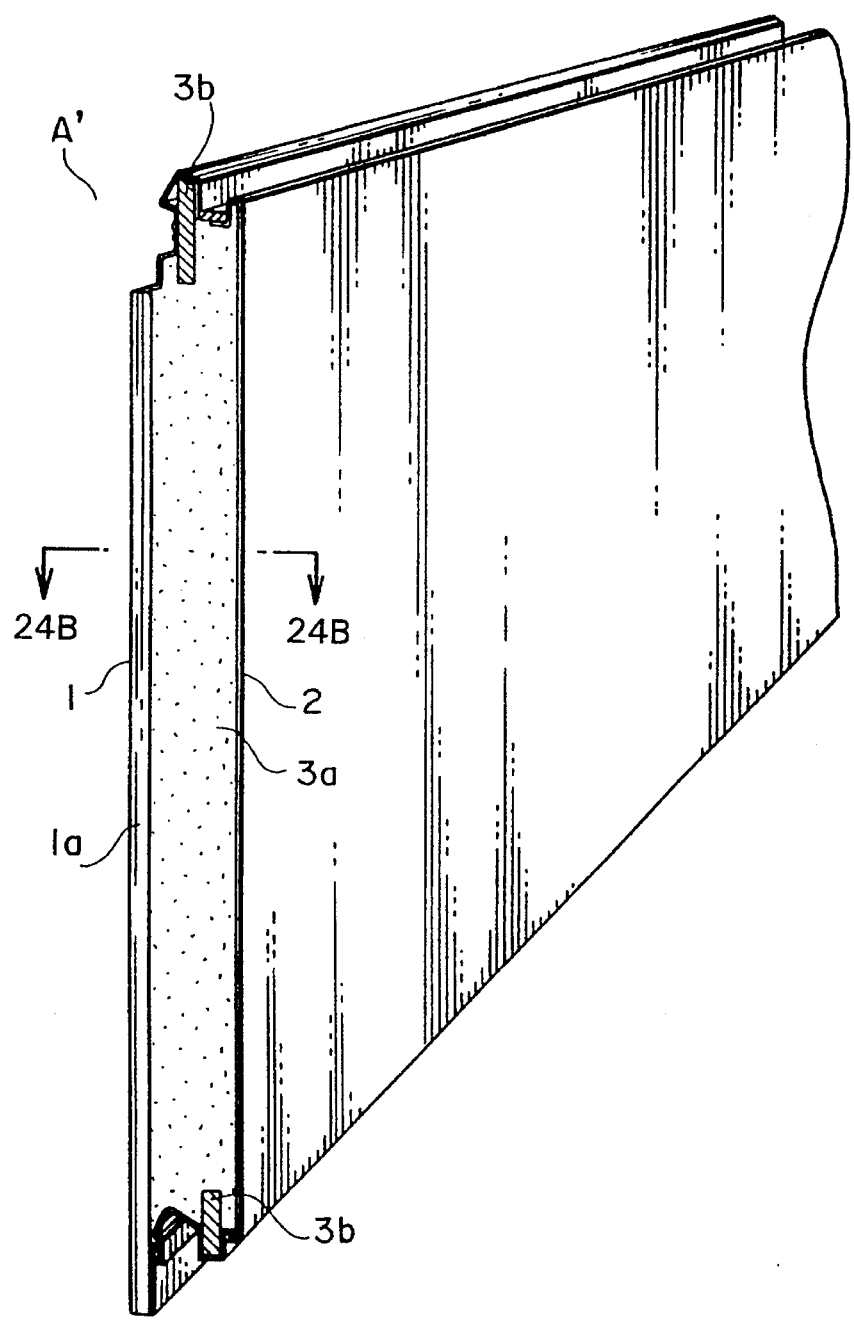
FIG. 24A is a perspective view showing another modification of the refractory panel according to the second embodiment.
Figure 24B:
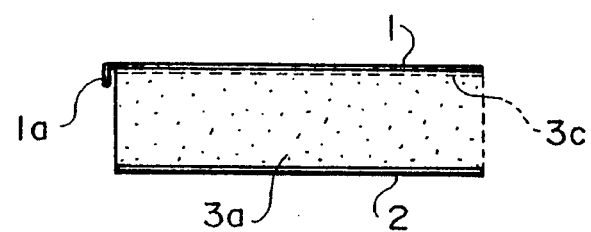
FIG. 24B is a cross-sectional view showing the refractory panel of FIG. 24A.

Still furthermore, FIGS. 24A and 24B (which is a 24B—24B line cross-sectional view of FIG. 24A) show the refractory panel A' which is provided with an end face wall 1a at both ends (cut ends) in the longitudinal direction of the refractory panel A' to improve the workability of a vertical jointing portion, the waterproof property and the external appearance of the arrangement.

As described above, the refractory panel of the above embodiment has the following features and effects: (1) the mechanical strength of the refractory panel is improved more greatly than that of conventional refractory panels, (2) it can pass various fireproof tests such as a fireproof structure test for building constructing portions (JIS-A-1304), a fireproof test for fireproof doors of buildings (JIS-A-1311), a fireproof test for fireproof warehouses (JIS-S-1037), etc., (3) adhesion between the core member and each of the front surface member and the back surface member is strong, and no exfoliation occurs between parts, (4) the holding of the panel can be surely performed because no deformation occurs, so that the holding power of the panels is heightened, and thus the panels are strong to shaking such as earth quake or the like, (5) since the inorganic boards are formed at both ends of the refractory panel, the fireproof performance of the link portions which is the weakest point to fire is greatly improved, (6) since the gas-permeable members are formed in the core member, even when the surplus undesired gas occurs in the core member, the gas-permeable members can efficiently discharge the surplus gas from the cut end of the refractory panel to the outside, so that the facing of the refractory panel can be prevented from being deformed (swelling, warping, etc.) for a long term, (7) productivity (yield) is improved, and (8) the number of claims which are made after the refractory panel is sold is greatly reduced.

FIGS. 25 to 35 show a third embodiment of the present invention in which microgasholes 8a are provided in the sandwich panel of the first embodiment or the refractory panel of the second embodiment (hereinafter referred to as "panel"). In this embodiment, the same elements as the first embodiment are represented by the same reference numerals.

Figure 25:
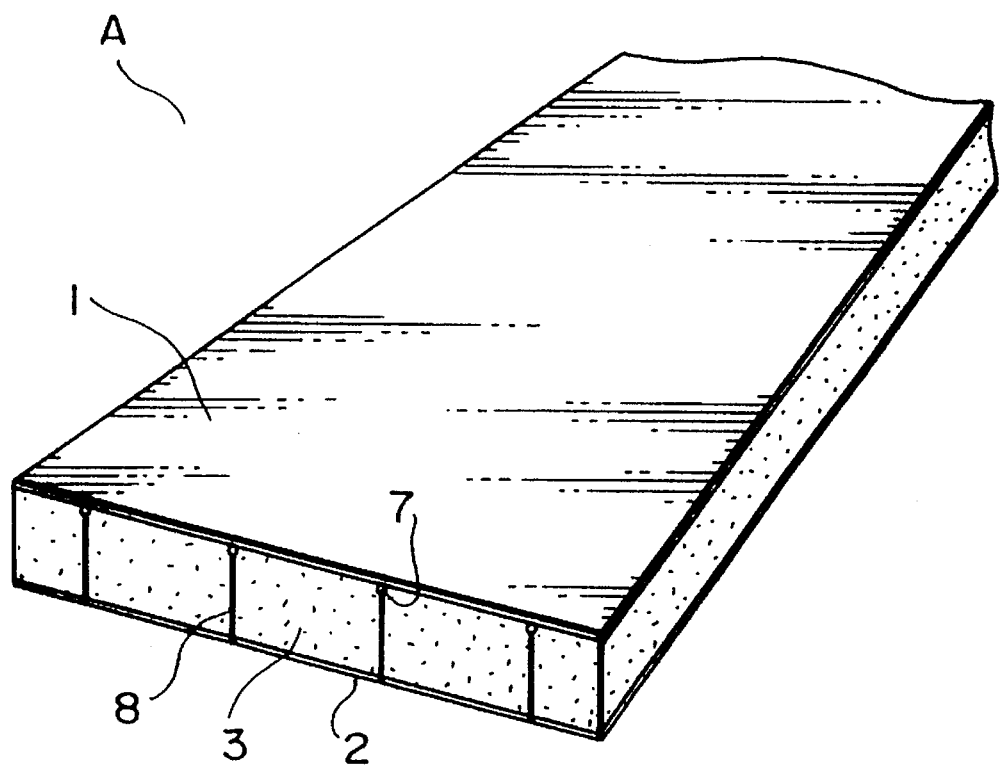
FIG. 25 is a perspective view showing a sandwich panel (composite panel or refractory panel) according to a third embodiment in which microgasholes are further provided to the sandwich panel of the first or second embodiment.
Figure 26:
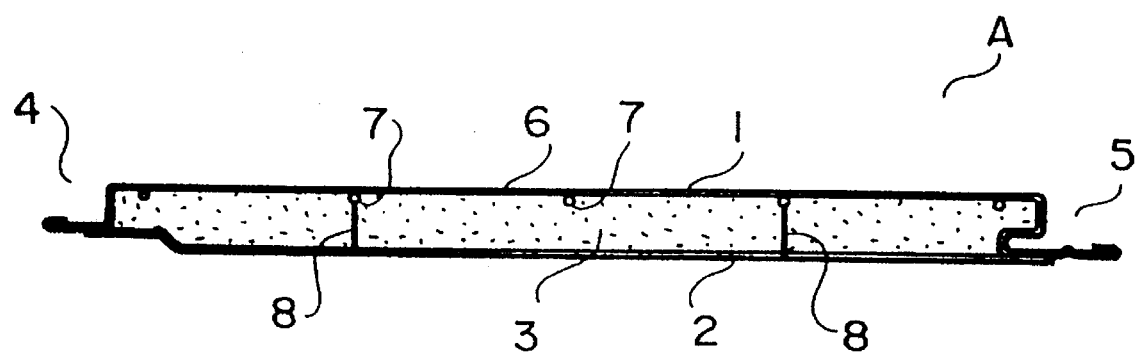
FIG. 26 is a cross-sectional view showing the sandwich panel shown in FIG. 25.
Figure 27:
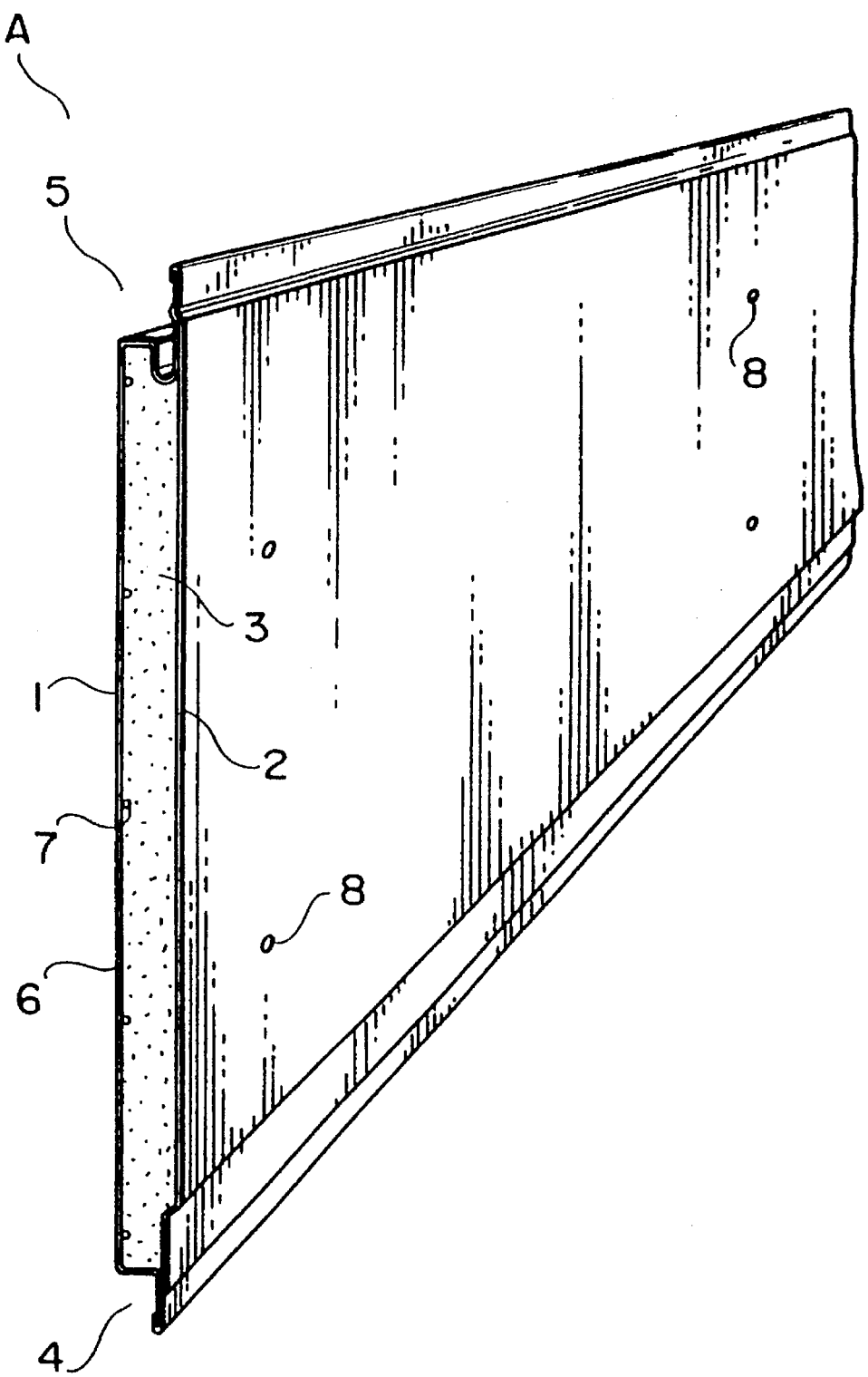
FIG. 27 is a perspective view of the sandwich panel having microgasholes formed on the back surface thereof.
Figure 28:
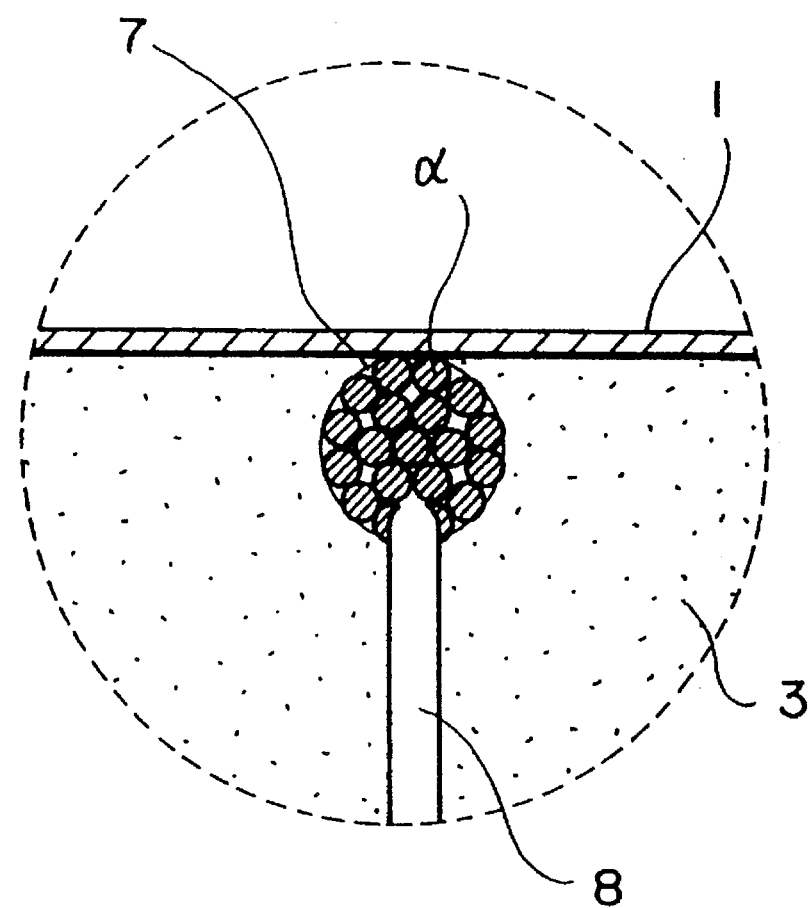
FIG. 28 is an enlarged cross-sectional view showing a state where the tip of a microgashole formed in the panel reaches a gas-permeable member.

FIG. 25 is a perspective view showing a panel in which gas-permeable members 7 and microgasholes 8 are provided to discharge the undesired gas to the outside more efficiently, and FIG. 26 is a cross-sectional view showing the panel shown in FIG. 25. FIG. 27 is a perspective view showing the panel of FIG. 25, which is viewed from the back surface member side of the panel, and FIG. 28 is an enlarged cross-sectional view showing a state where the tip of a microgashole formed in the panel extends to a gas-permeable member 7.

As shown in FIGS. 25 to 28, each microgashole 8 is formed as a gas discharge passage which extends from the back surface member 2 toward the core member 3, and in this embodiment it is designed to extend to the gas-permeable member 7. The microgashole 8 is used to more efficiently discharge to the outside of the panel the surplus gas components (chlorine, carbon dioxide, methylene chloride, formaldehyde, steam, hydrogen), etc. which pass through the gas-permeable member 7. However, even if the microgashole 8 is designed not to extend to the gas-permeable member 7, the surplus gas components, etc. which are produced in the neighborhood of the microgashole 8 can be discharged through microgashole 8 to the outside more efficiently. The dimension (diameter) of each microgashole 8 is set to about 0.1 to 5 mmφ.

Figure 29A:
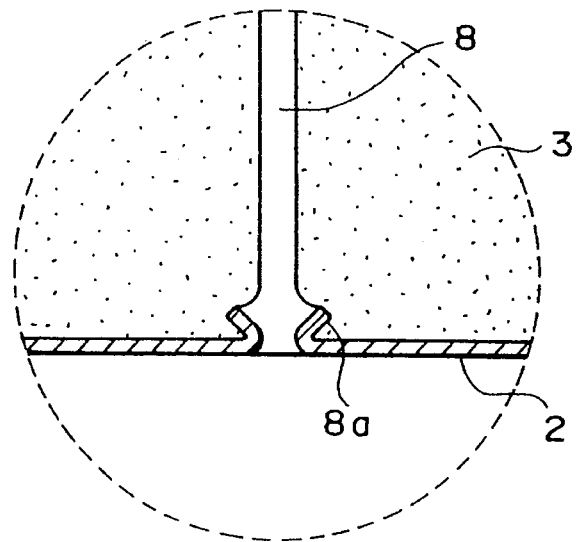
FIGS. 29A to 29C are partially enlarged perspective views showing various shapes of a holding member which is formed together with the microgashole.
Figure 29B:
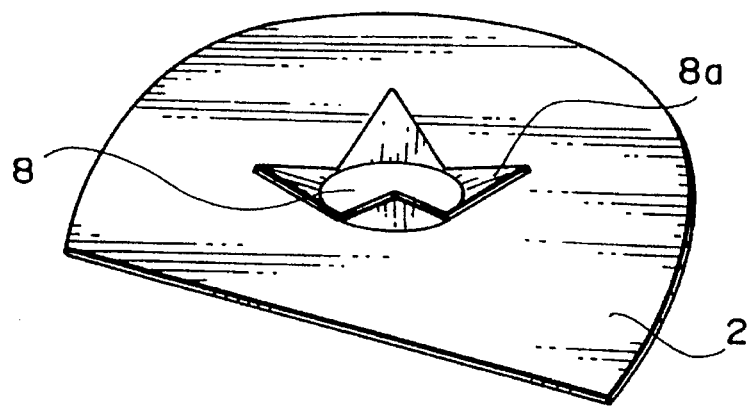
Figure 29C:
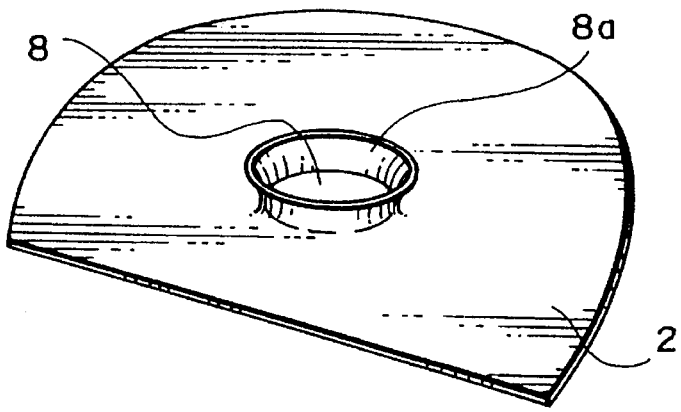

When the microgashole 8 is formed, a holding piece 8a is also formed at the same time. The holding piece 8a functions to greatly improve the adhesion strength between the core member 3 and the back surface member 2, and it may be designed in various shapes as shown in FIGS. 29A to 29C. In FIG. 29A, the holding piece 8a is designed to be bent toward the inside of the core member 3, and thus it intrudes into the core member 3 and acts as an anchor. In FIG. 29B, the holding piece 8a is designed to be bent toward the outside of the back surface member 2 in a star shape, and in FIG. 29C, the holding piece 8a is designed to be bent toward the outside of the back surface member 2 in a bell-mouth shape. With respect to the holding pieces 8a having the shapes shown in FIGS. 29B and 29C, the holding pieces 8a are projected toward the outside of the back surface member 2, and engaged with the surface of the back surface member 2, so that these also act as an anchor.

With the construction of the panel, the discharge of the surplus gas, etc. to the outside is performed more efficiently. Therefore, the front and back surface members of a panel can be more prevented from being deformed (swelling, warping, etc.) due to the internal gas produced after the panel is manufactured, and it has more strong mechanical strength and more excellent fireproofing property.

The third embodiment of the present invention is not limited to the above embodiment, and it is needless to say that the various arrangements of the gas-permeable members and the shapes thereof (FIG. 3A to FIG. 9), and the various panel structures (FIG. 10 to FIG. 15B) are applicable to the third embodiment as described above.

Figure 31A:
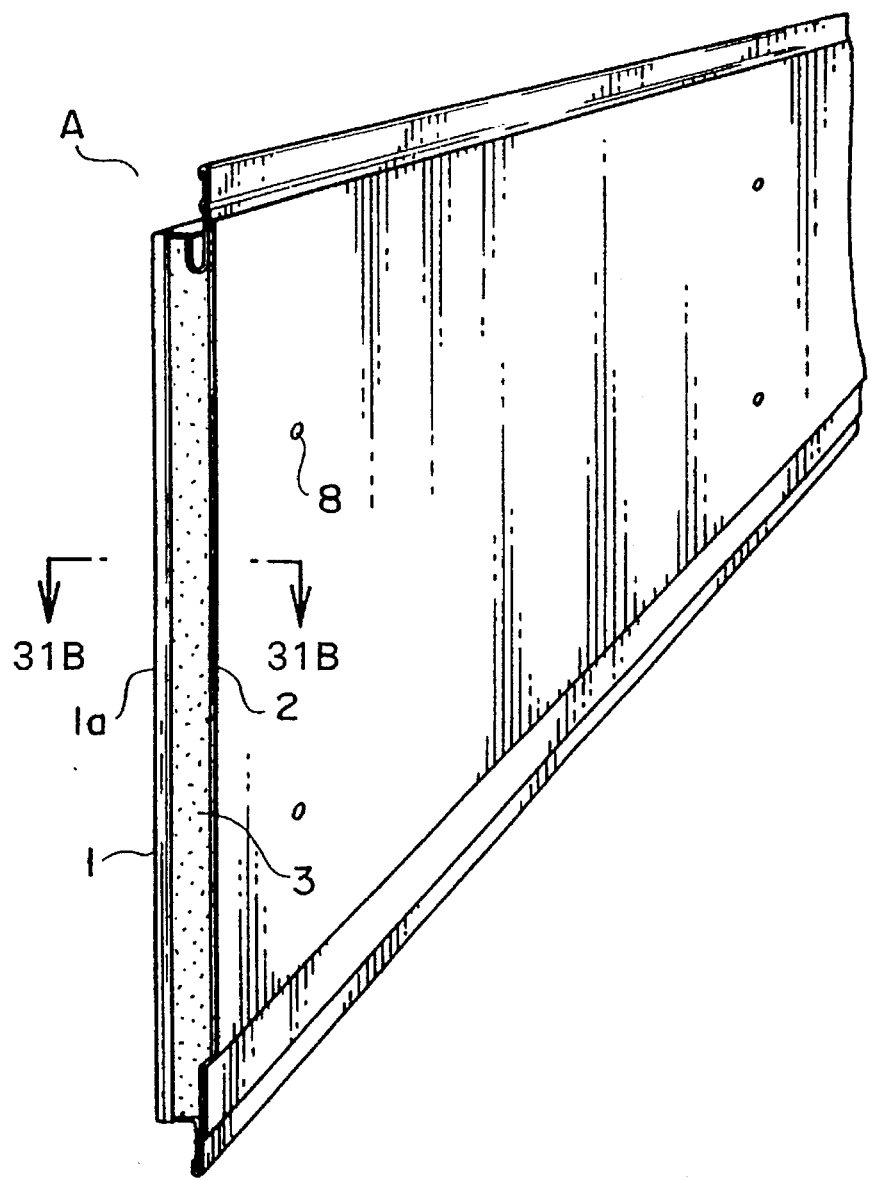
FIG. 31A is a perspective view showing the sandwich panel having microgasholes and gas-permeable members, which is viewed from the back surface of the sandwich panel.
Figure 31B:
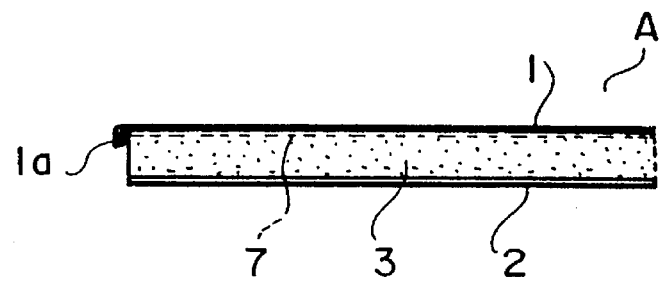
FIG. 31B is a cross-sectional view of the sandwich panel of FIG. 31A.
Figures 33A, 33B, 33C, 33D:
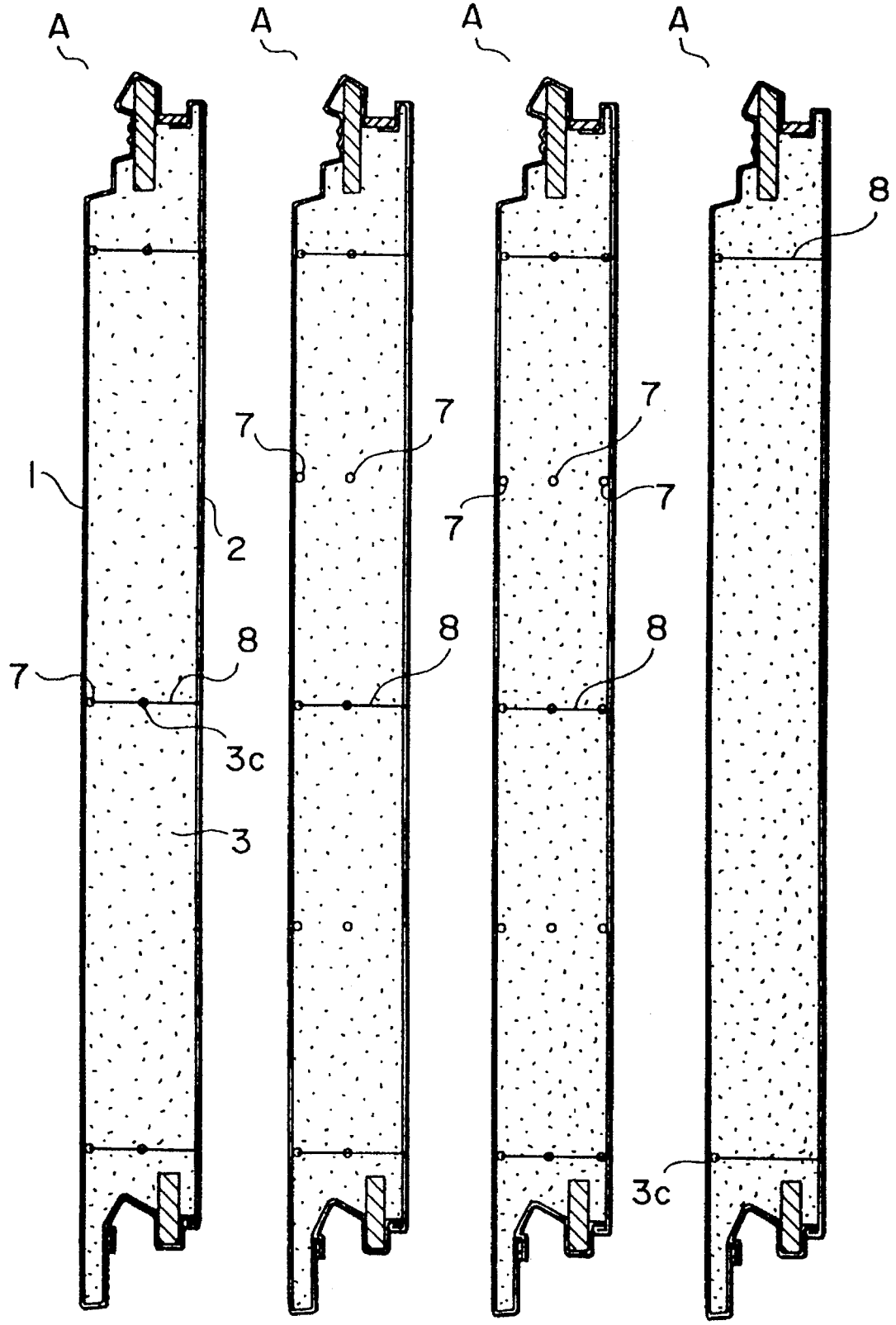
Figure 34A:
FIGS. 34(a)–34(h) show various cross-sectional shapes of the microgashole.
Figure 34B:
Figure 34C:
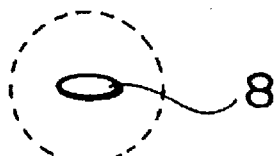
Figure 34D:
Figure 34E:
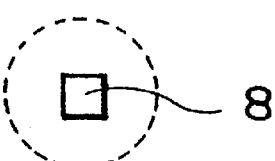
Figure 34F:
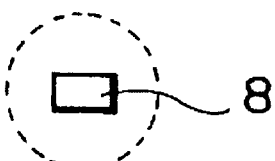
Figure 34G:
Figure 34H:
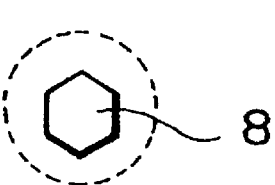

FIGS. 30 and 31 show a case where the microgasholes 8 of this embodiment are formed in the sandwich panel of the first embodiment, and FIGS. 32 and 33 show a case where the microgasholes 8 of this embodiment are formed in the refractory panel of the second embodiment.

Figure 35A:
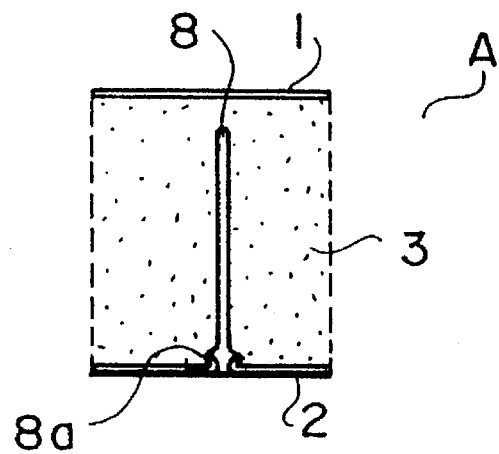
FIGS. 35(a)–35(c) show various longitudinally-sectional shapes of the microgashole.
Figure 35B:
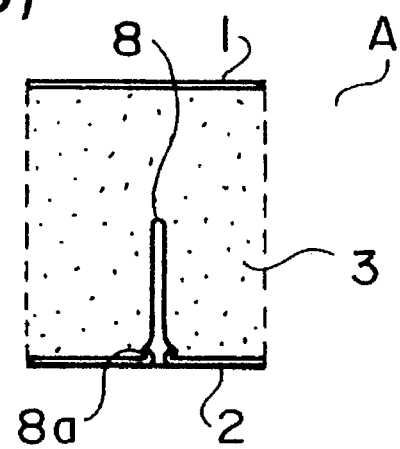
Figure 35C:
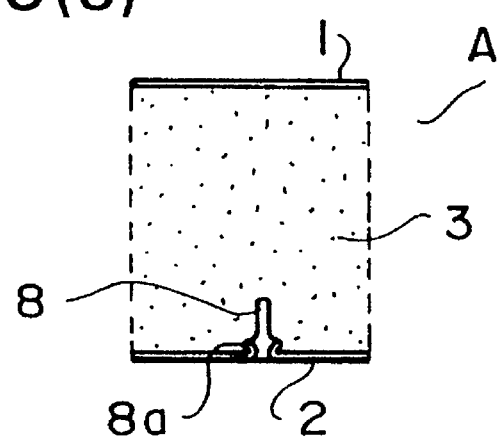

The microgashole 8 may be designed in various cross-sectional and longitudinally-sectional shapes as shown in (a) to (h) of FIG. 34, and in (a) to (c) of FIG. 35.

As described above, according to the panel of this embodiment, there are following features and effects: (1) since the gas-permeable members are formed in the core member, and the microgasholes are formed from the back surface member side of the panel, the surplus gas, etc. produced in the core member can be more efficiently discharged through the gas-permeable members and further the microgasholes to the outside of the panel, so that the deformation such as swelling, warping, etc. of the facing of the panel can be suppressed for a long term, (2) the panel can be surely held because no deformation occurs, and thus it is strong to earth quake or the like, (3) since the holding piece is provided to the microgashole, the adhesion strength between the core member and the back surface member is improved, (5) productivity (yield) is improved, and (6) the number of claims is reduced.

Figure 36:
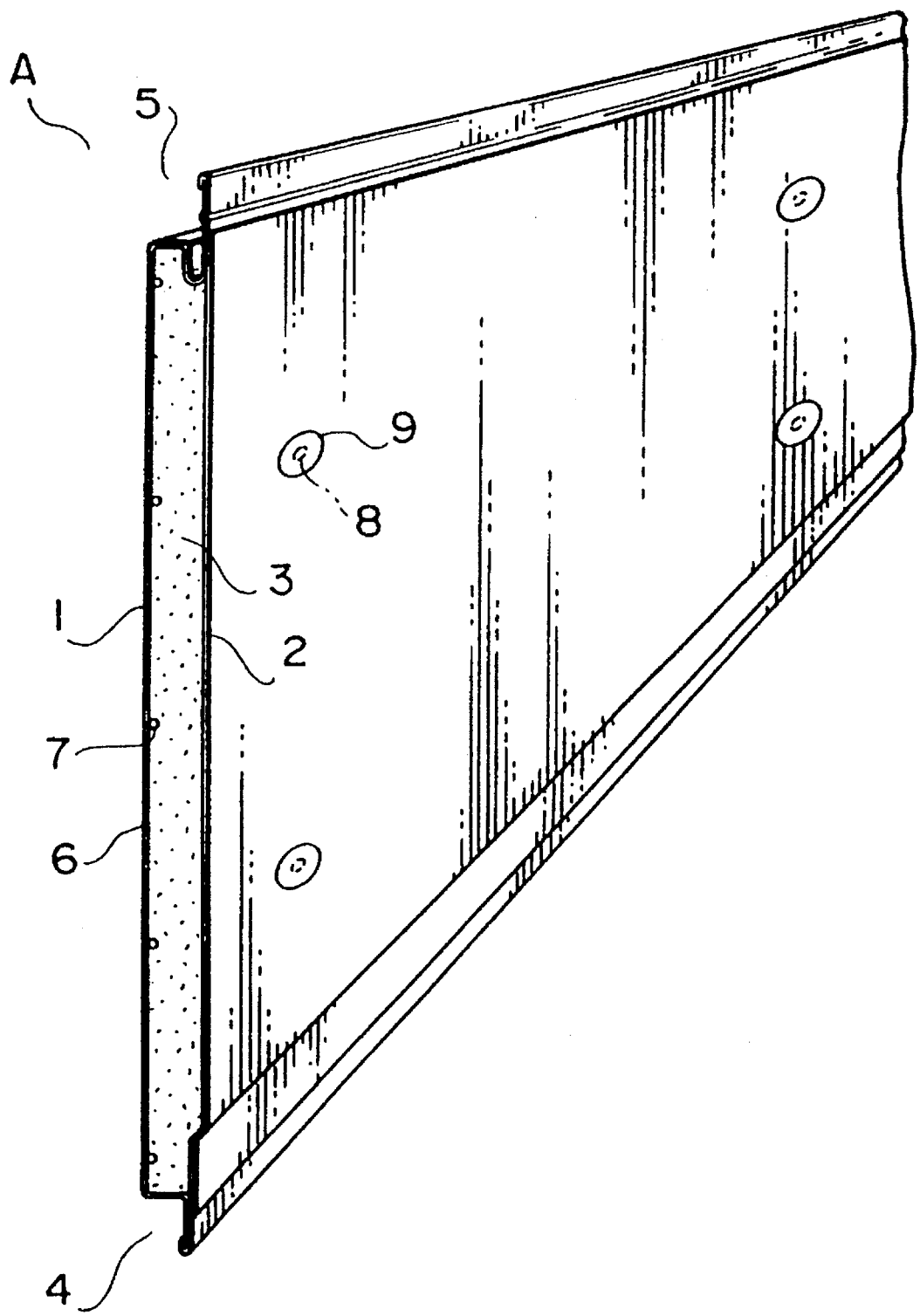
FIG. 36 is a perspective view showing a sandwich panel (composite panel or refractory panel) according to a fourth embodiment of the present invention in which gas-permeable waterproof sheets are provided to shield the microgasholes formed on the back surface member of the panel of FIG. 27.
Figure 37A:
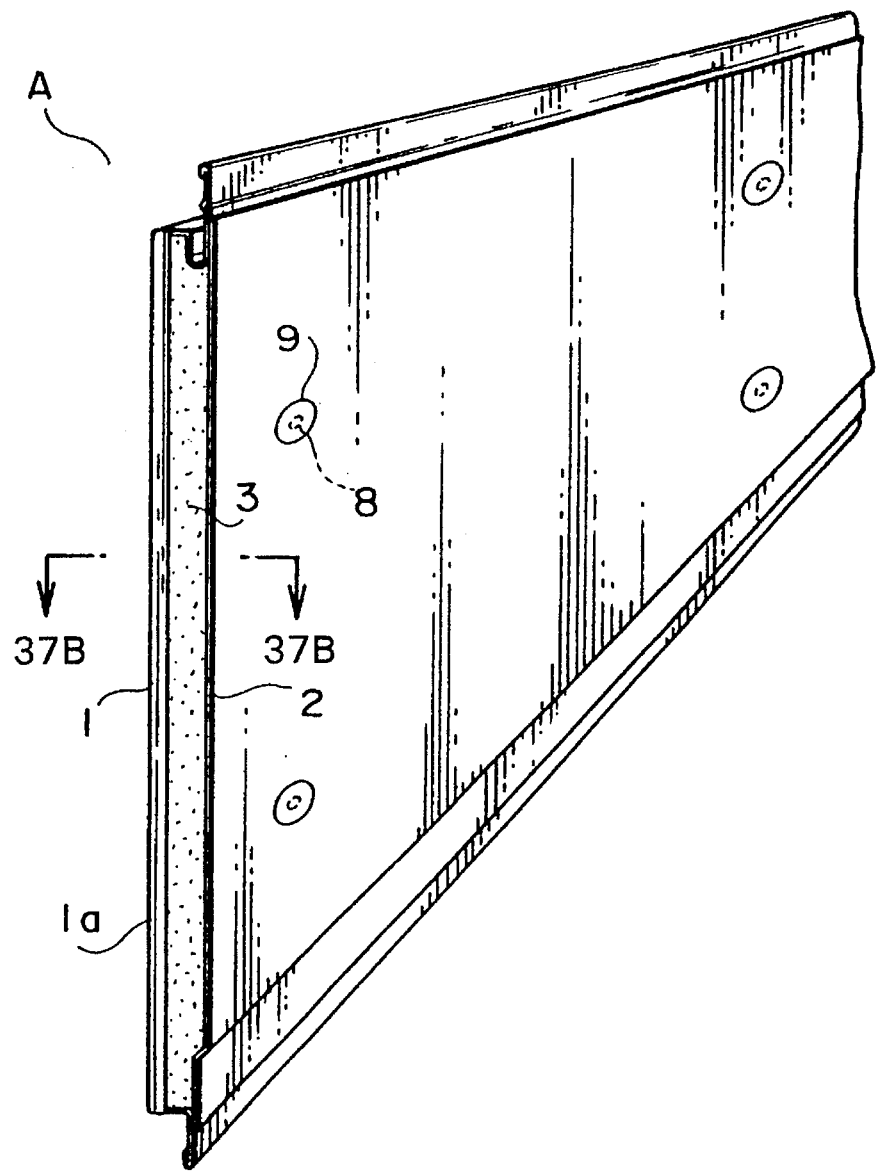
FIGS. 37A and 37B are perspective and cross-sectional views showing the sandwich panel which is provided with gas-permeable and waterproof sheets for shielding the microgasholes formed on the back surface member of the sandwich panel shown in FIGS. 31A and 31B.
Figure 37B:
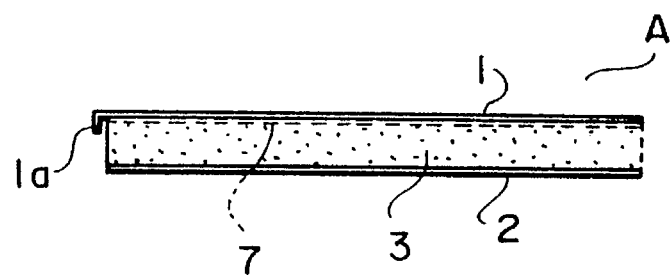
Figure 39A:
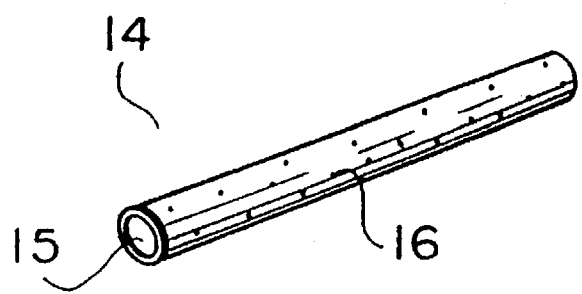
FIGS. 39(a)–39(f) show various embodiments of the hole forming member formed in the sandwich panel.
Figure 39B:
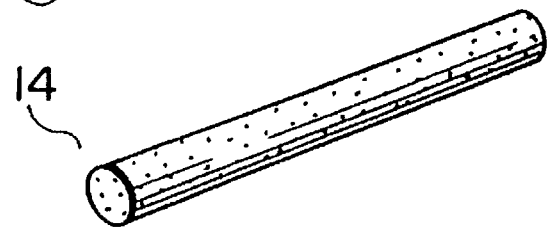
Figure 39C:
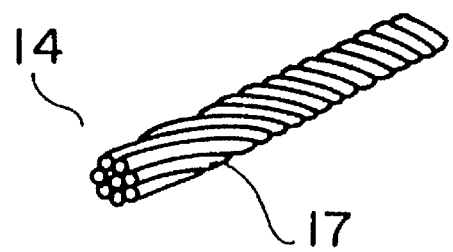
Figure 39D:
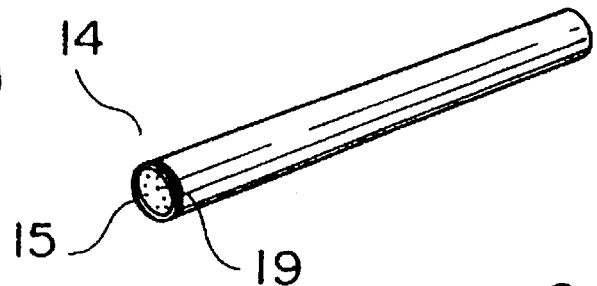
Figure 39E:
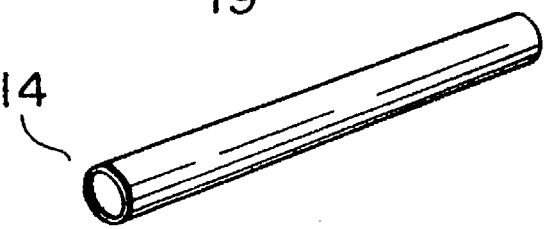
Figure 39F:
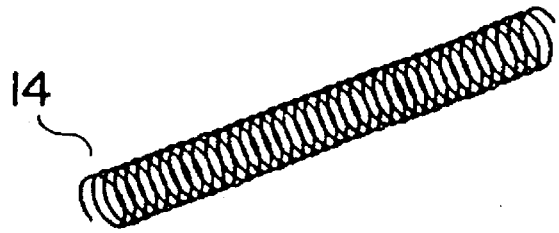

FIGS. 36, 37A and 37B show a fourth embodiment of the present invention. In this embodiment, the panel of the third embodiment as described above is further provided with a gas-permeable and waterproof sheet 9 for shielding each microgashole 8 which is formed on the back surface member side of the panel.

The gas-permeable and waterproof sheet 9 is provided (laminated) so as to cover at least the surface of each microgashole 8 which is formed on the back surface member 2, and it is used to prevent invasion of rain drops, etc. from the surface of the panel A through the microgasholes 8 into the panel A (that is, the core member 3) without disturbing the discharge of the surplus gas, etc. from the core member 3 through the microgasholes 8 to the outside.

The gas-permeable and waterproof sheet 9 is generally laminated on the back surface member 2 with adhesive agent, and in this case it is required to be considered that no adhesion is interposed at least between the microgashole 8 and the gas-permeable and waterproof sheet 9 so that the gas permeability of the gas-permeable and waterproof sheet 9 is not deteriorated.

With the construction of the panel as described above, the front surface member and the back surface member of the panel after the panel is manufactured suffers no deformation (no swelling, no warping, etc.) due to the internal gas, and the panel has high mechanical strength and excellent fireproofing property.

According to this embodiment, in addition to the effects as described above for the first to third embodiments, there can be obtained another effect that rain drops, etc. can be prevented from invading from the surface of the panel into the panel (that is, the core member 3) without disturbing the discharge of the surplus gas, etc. from the core member 3 through the microgasholes 8 to the outside because the gas-permeable and waterproof sheet is laminated on the surface of the back surface member.

In the third embodiment as described above, the panel is provided with the gas-permeable members and the microgasholes to discharge the internal gas produced in the core member to the outside of the panel. However, the same effect as described above can be also obtained by using a hole forming member as described below in place of the gas-permeable members and the microgasholes.

The hole forming member is formed of a string-shaped member which is dissolved or contracted with time lapse in the panel and finally functions as gas discharge holes (passages) through which the internal gas such as the surplus undesired gas, etc. produced in the panel with time lapse is discharged to the outside of the panel, or a string-shaped member which has a large number of holes therein through which the internal gas is discharged to the outside of the panel. The hole forming member is embedded at suitable positions in the vertical and horizontal directions or in a fixed direction of the core member of synthetic resin foam (plastic foam), or at the boundary between the core member and at least one of the front and back surface members.

FIGS. 38A to 47 show a fifth embodiment in which the hole forming member as described above is used in place of the gas-permeable member and the microgashole of the third embodiment.

FIGS. 38a and 38B are perspective views showing a sandwich panel to which the fifth embodiment of the present invention is applied. The sandwich panel of this embodiment has substantially the same construction as the sandwich (fireproof) panel as described above except that the hole forming member 14 is used in place of the gas-permeable member and the microgashole, and it is formed at suitable positions of the core member so as to be integral with the core member 3 which is sandwiched between the front surface member 1 and the back surface member 2. In the fifth embodiment, the same elements as the first to fourth embodiments are represented by the same reference numerals, and the detailed description thereof is omitted.

The hole forming member 14 is formed of a material which is dissolved or contracted over several days to several months by components such as foaming agent, acidic hardening agent, resin component, flameproofing agent, reinforcing agent or the like to form a circular section, a polygonal section or any other hollow section, or it is formed of a fibrous material which is designed so that the internal gas can leak through gaps between twisted portions thereof. Specifically, the hole forming member 14 is formed by shaping cotton, glass fiber, starch, animal fiber or vegetable fiber in a linear shape, a net shape, a rod shape, a tape shape or the like, and its sectional area is set to about 0.01 to 10 mm$^2$. FIG. 38A shows the panel just after it is manufactured, and FIG. 38B shows the same panel after a prescribed time elapses, in which the hole forming member 14 becomes a hollow portion 24 through a solving or contracting process.

The hole forming member 14 may have various constructions as shown in FIG. 39. For example, in (a) of FIG. 39, the hole forming member 14 is formed with or has fine holes 16 on the outer peripheral surface of a hollow body 15. In (b) of FIG. 39, the hole forming member 14 has a dense solid body which has or is formed with fine holes. In (c) of FIG. 39, the hole forming member 14 is formed of a linear fibrous member obtained by twisting fibers 17. In (d) of FIG. 39, the hole forming member 14 comprises a hollow body 15 and a filler 19 filled in the hollow body 15, and the filler 19 itself is dissolved at a temperature of about 60° to 100° C., whereby the hollow body 15 is also dissolved or the whole construction of the hole forming member 14 is contracted to form a hollow portion 24 (gas hole) at any position in the core member 3. In this case, the filler 19 may be formed of at least one kind of starch, plastic having low melting point which is dissolved or contracted at a temperature of about 60° to 80° C., alginic acid, paraffine, rubber having low melting point, styrene resin, etc. In (e) of FIG. 39, the hole forming member 14 comprises a linear hollow body, and in (f) of FIG. 39, the hole forming member 14 comprises a linear coil body. In these cases, the internal gas which is produced at the reaction time or after the reaction is guided through the central portion of the linear bodies to the outside of the panel. Particularly in the coil body, a gap is liable to be formed between wires of the coil body due to surface tension, and thus the gas is liable to invade into the center portion of the coil. The coil may be formed of stainless or steel which is coated with resin, paraffine or the like, or it may be formed of resin coil.

Figure 40A:
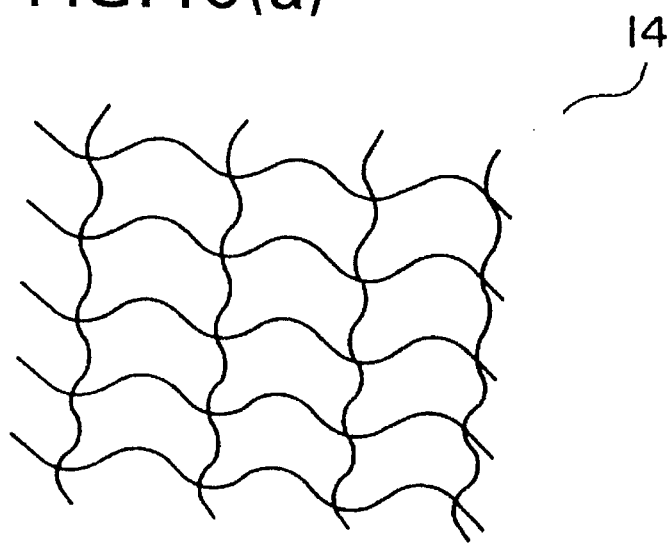
Figure 40B:
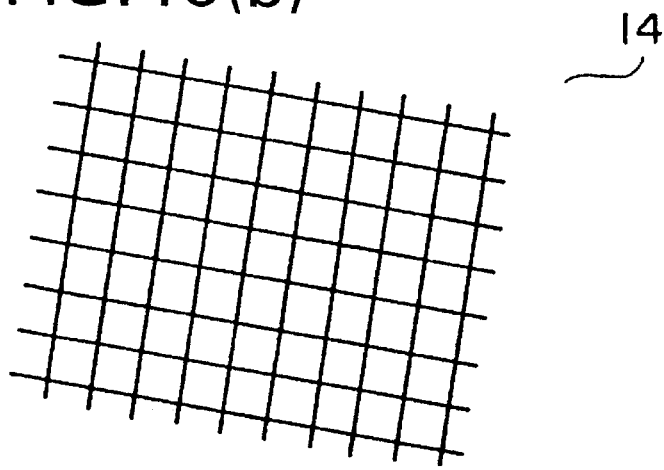
Figure 40C:
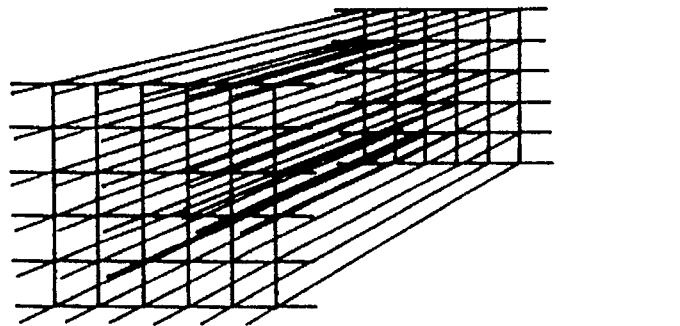
Figure 41A:
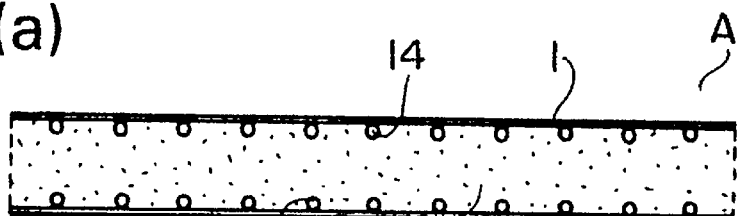
FIGS. 41(a)–41(d) show other embodiments of the hole forming member formed in the sandwich panel.
Figure 41B:
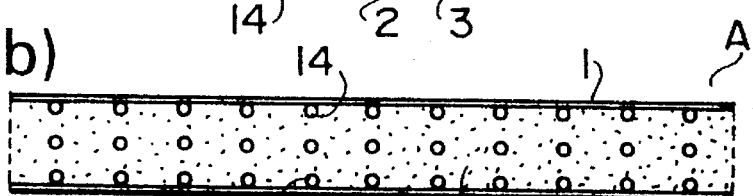
Figure 41C:
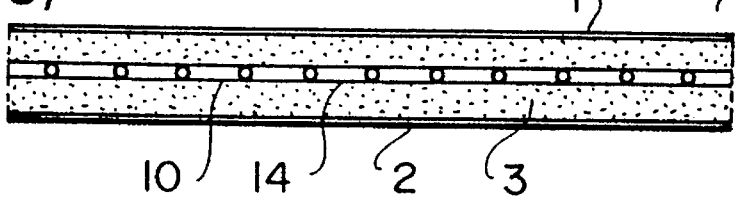
Figure 41D:
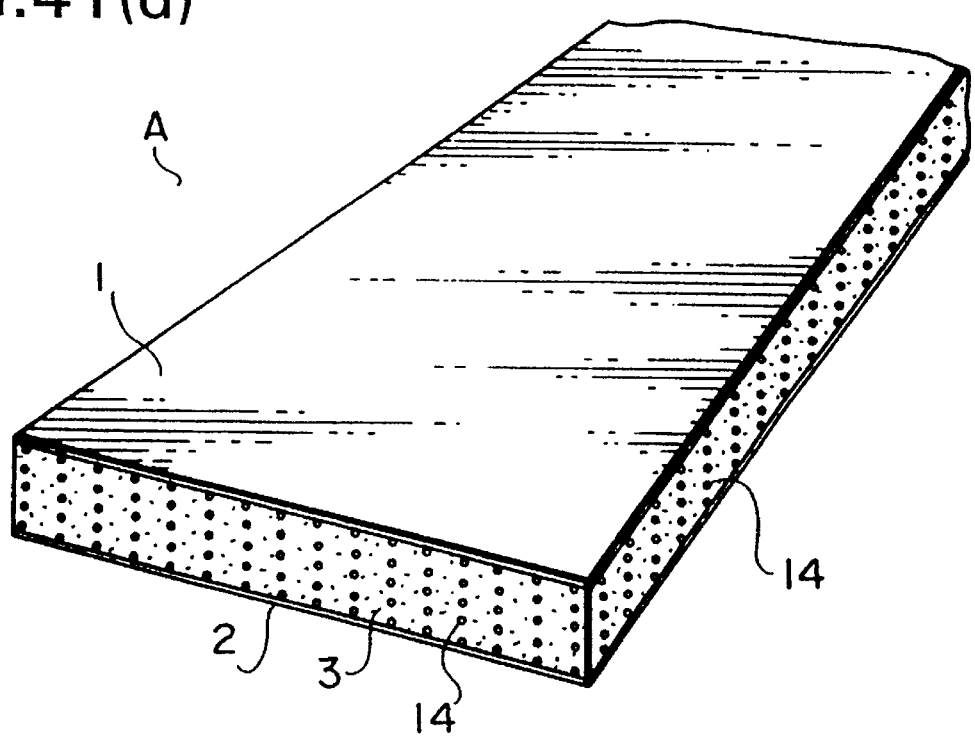

The arrangement for hole forming members 14 thus constructed is not limited to a linear arrangement, but various arrangements shown in FIG. 40 may be applied. That is, the hole forming members 14 may be arranged not only in a linear array, but also in a net-sheet shape shown in (a) of FIG. 40, in a mesh-sheet shape shown in (b) of FIG. 40, and in a lattice shape shown in (c) of FIG. 40. Particularly the lattice arrangement of the hole forming members has a honeycomb function of extremely shortening a pass through which the internal gas in the core member 3 is discharged to the outside of the panel, and thus it has an excellent gas-discharge effect.

FIGS. 41 to FIG. 46 show other arrangements of the hole forming members 14 in the panel A (composite panel or refractory panel) according to the fifth embodiment. That is, in (a) of FIG. 41, the hole forming members 14 are arranged at a predetermined pitch at the boundary between the front surface member 1 and the core member 3 and at the boundary between the back surface member 2 and the core member 3. In (b) of FIG. 41, the hole forming members 14 are laminated in a three-layered structure in the core member 3 of the panel. In (c) of FIG. 41, the hole forming members 14 which are arranged in a linear shape, a cloth shape, a net shape or a lattice shape are unified through an adhesive thin film 10 of isocyanide group, and the core member 3 is injected onto the unified array of the hole forming members 14 to unify the constructive elements of the panel A into one body. In (d) of FIG. 41, the hole forming members 14 which are laminated in a five-layered lattice structure are embedded in the panel A.

Figures 43A, 43B, 43C, 43D:
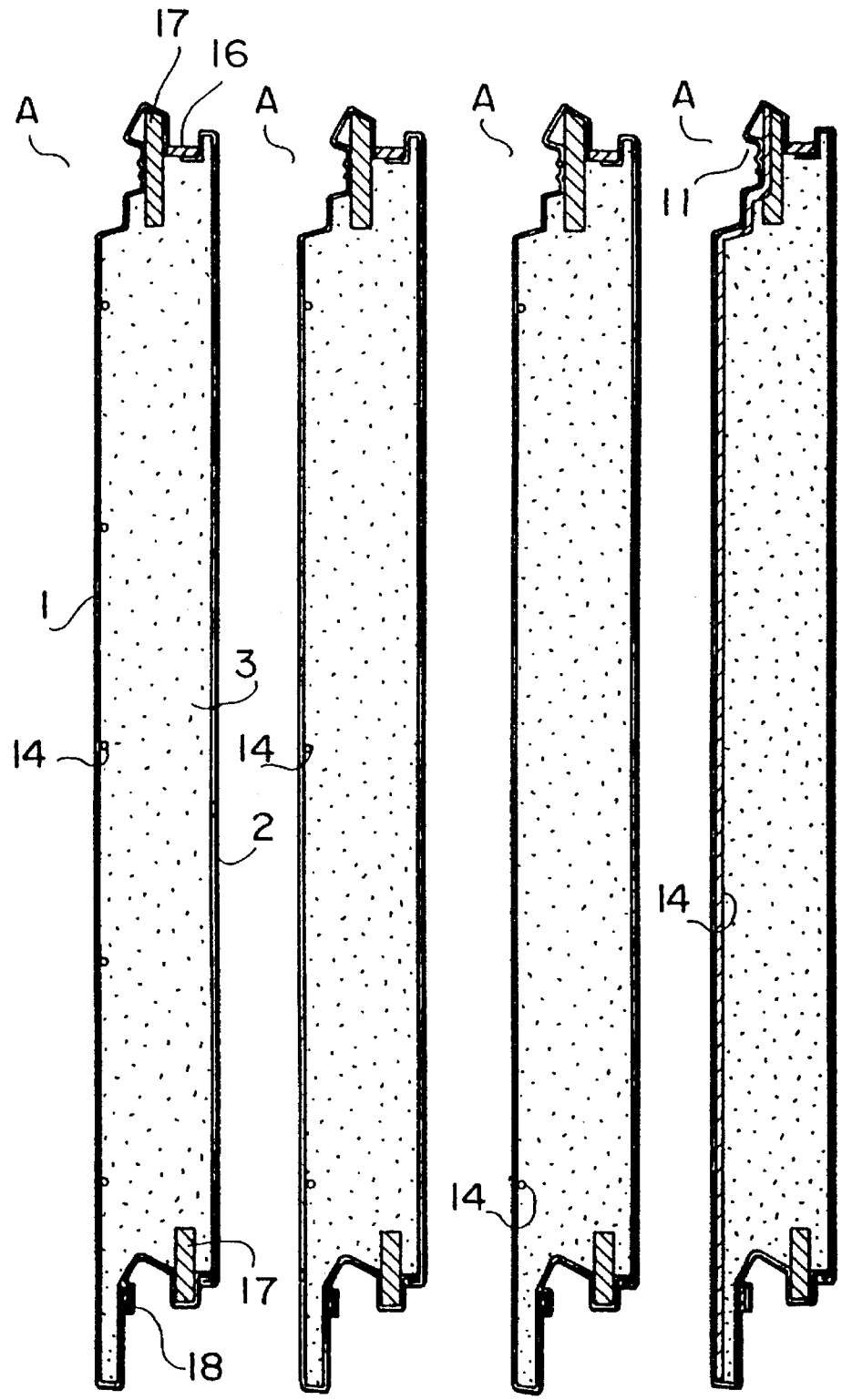
Figure 44:
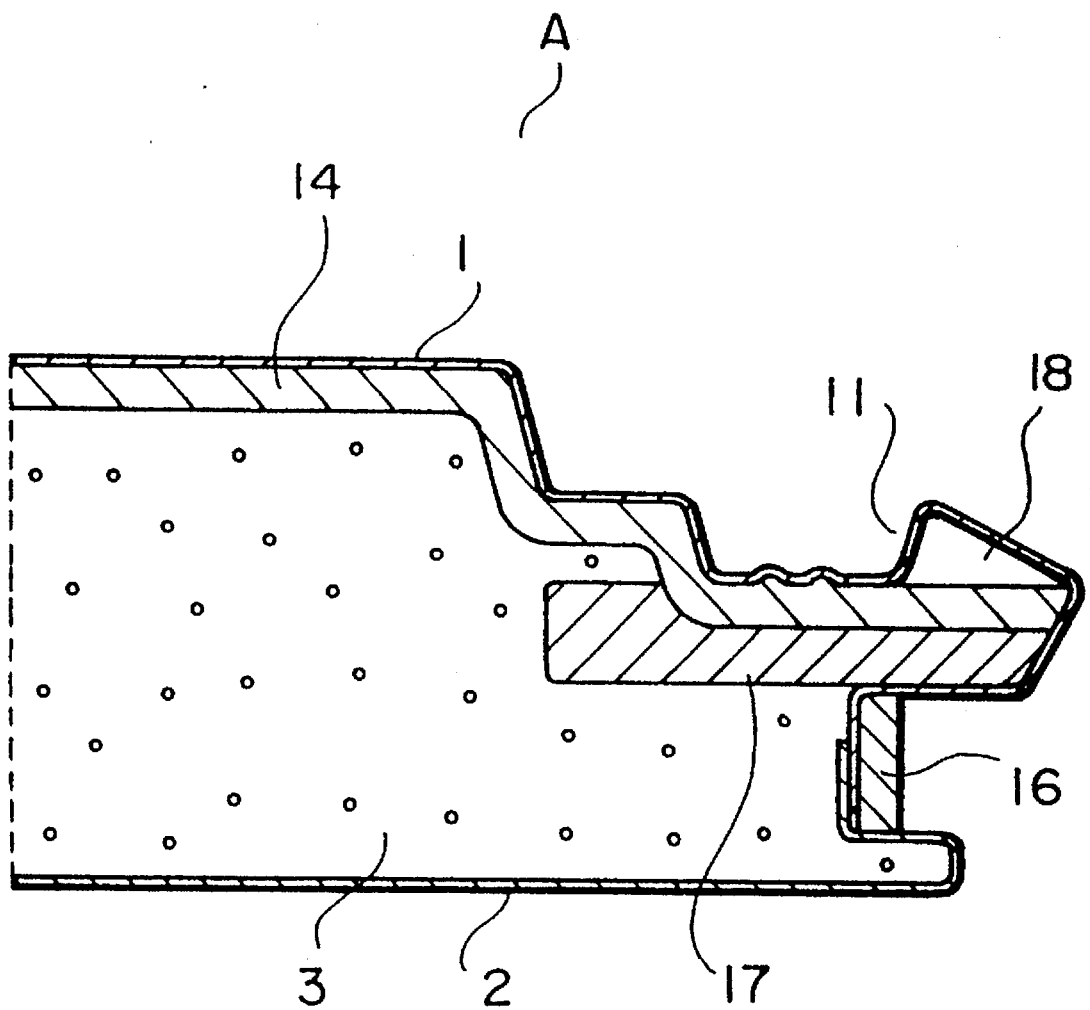
FIG. 44 is a cross-sectional view showing another embodiment of the sandwich panel of the fifth embodiment in which a hole forming member is formed.

FIGS. 42 and 43 shows various arrangements of the hole forming members 14 in the sandwich panel. In FIG. 42, (a) to (c) show panels A in which the hole forming members 14 are formed inside the core member 3, and (d) and (e) show panels in which the hole forming members 14 are formed on the back surface 1a of the front surface member 1. In FIG. 43, (a) to (c) show panels in which five, three and two hole forming members are respectively embedded on the back surface of the front surface member 1, and (d) shows a panel in which a hole forming member is formed on the back surface of the front surface member 1 so as to extend in a direction perpendicular to the extending direction of the hole forming members of (a) to (c) of FIG. 43. FIG. 44 is an enlarged cross-sectional view of the panel A of (d) of FIG. 43. In the panel A of FIG. 44, the undesired gas produced between the back surface 1a of the front surface member 1 and the core member 3 is guided through the hole forming member 14 to a hollow portion 18, and discharged from the hollow portion 18 through a penetration hole 11 to the outside of the panel A.

Figures 46A, 46B, 46C, 46D:
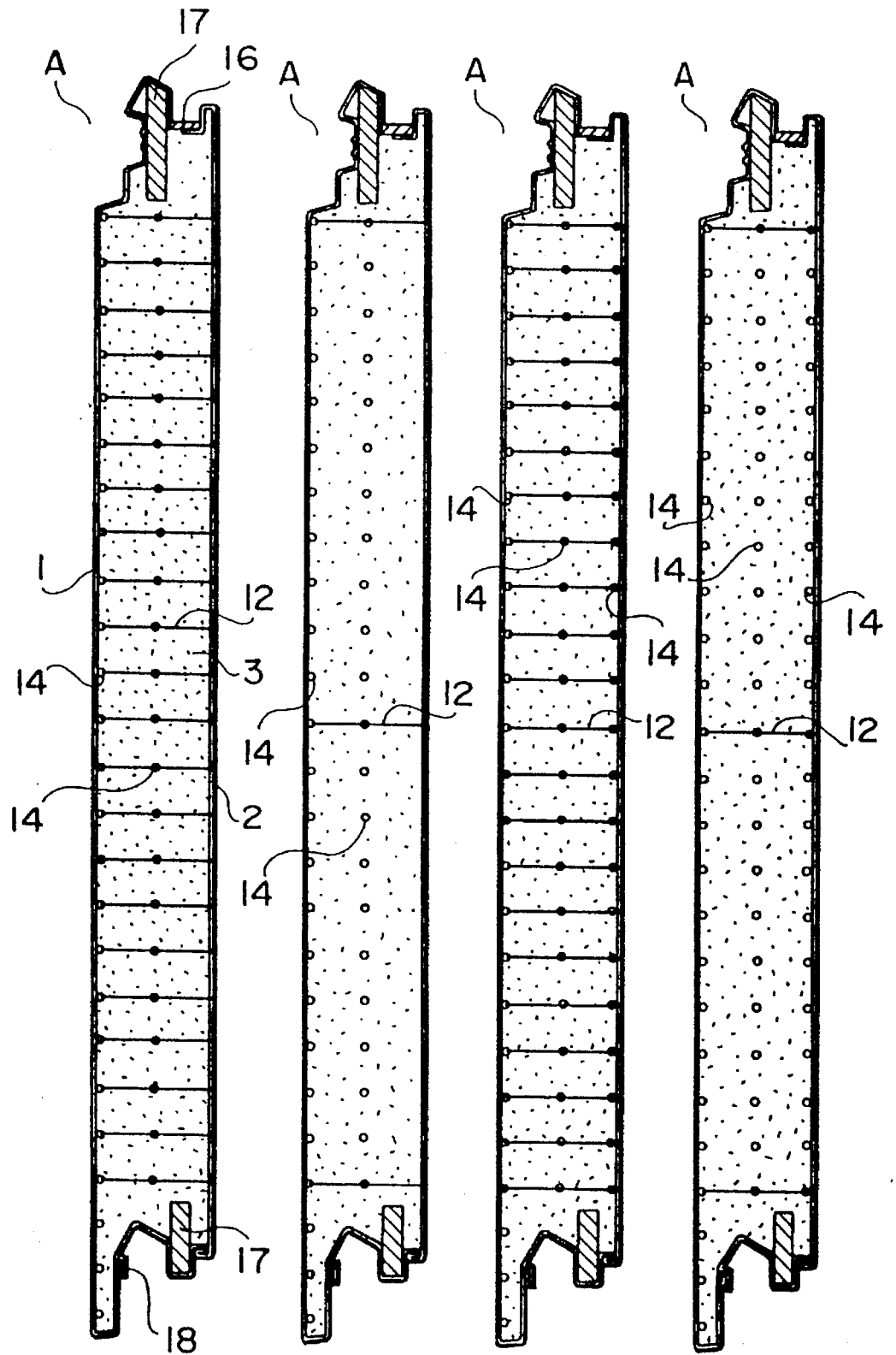
Figure 47A:
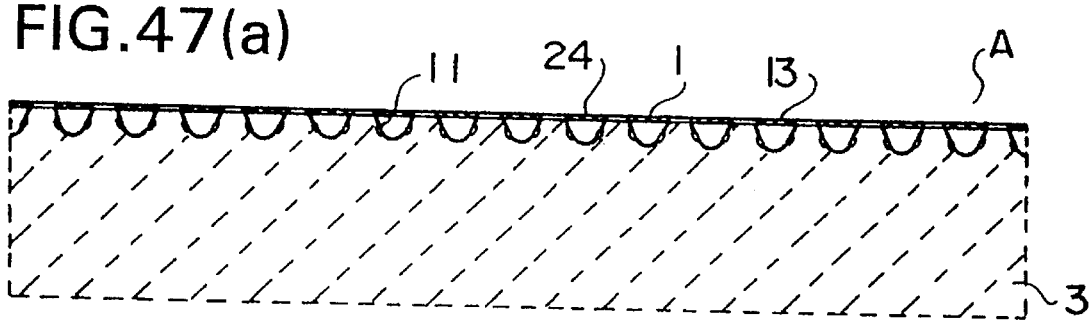
FIGS. 47(a)–47(d) are cross-sectional views of other embodiments of the sandwich panel of the fifth embodiment.
Figure 47B:
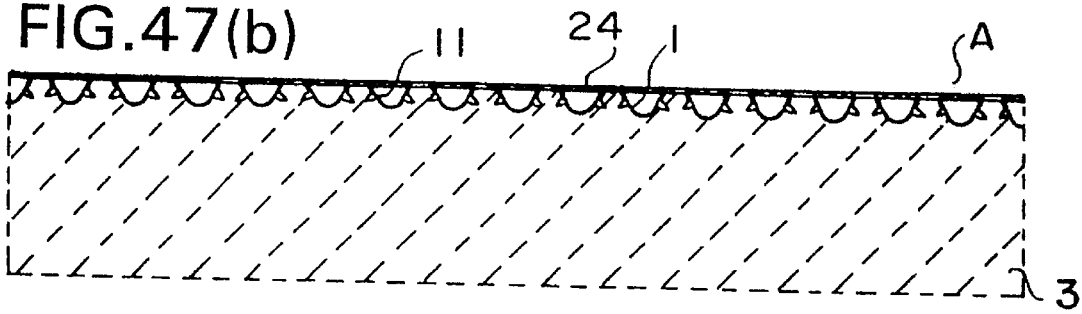
Figure 47C:
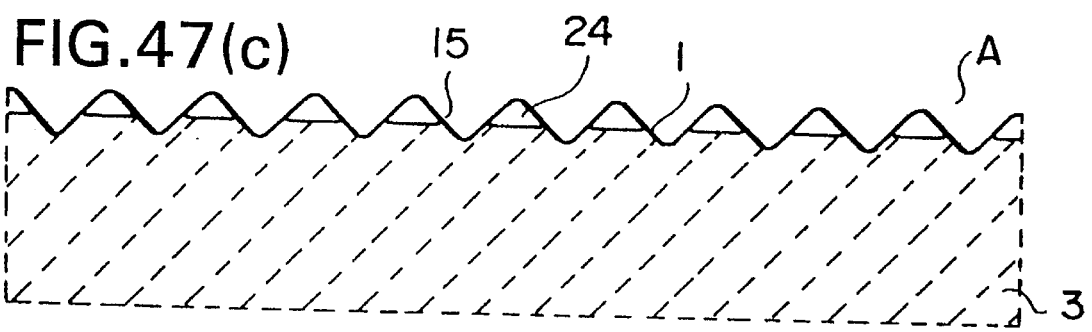
Figure 47D:
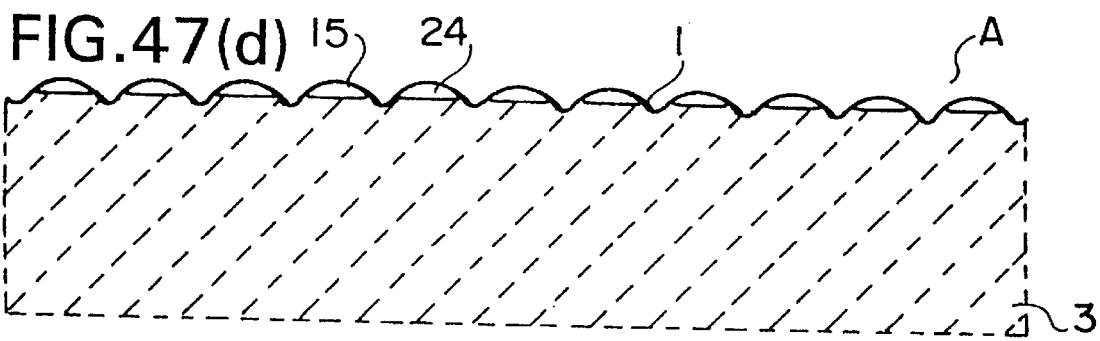
Figure 47E:
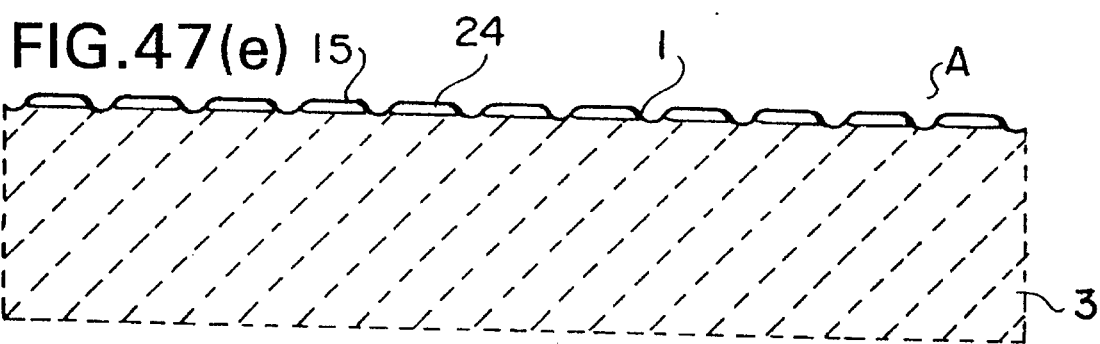

Furthermore, as shown in FIGS. 45 and 46, the panels as described above may be further provided with blind holes which have a diameter of about 1 to 5 mmφ and extend from the back surface member 2 to the neighborhood of the back surface 1a of the front surface member 1, whereby exfoliation or peeling-off of the front surface member 1 and the core member 3 can be prevented more surely. In this embodiment, the hole forming members may be formed at any positions, and the number thereof may be set to any number.

FIG. 47 shows other embodiments of the composite or refractory panel of the present invention. In (a) of FIG. 47, the surface of the front surface member 1 is roughened, and many penetration holes 11 each having a diameter of 0.1 to 2 mmφ are formed at any intervals, particularly at the recess portions of the roughened surface. A weatherproofing and waterproofing sheet 13 is adhesively attached onto the roughened surface to form hollow portions 24. In (b) of FIG. 47, the front surface member 1 and the core member 3 are unified into one body, then penetration holes 11 are formed, and then the sheet 13 is fixedly attached onto the surface of the unified body to form hollow portions 24. In (c) to (e) of FIG. 47, the hole forming members 14 are filled in the tip portions of the projection portions 15 of the roughened surface. The filled hole forming members 14 are contracted or dissolved to form hollow portions 24 for gas discharge. Furthermore, the hole forming member 14 may be formed of a string-shaped fibrous member containing paraffine or wax which is melted at 150° C. or less.

In FIGS. 42 to 46, reference numeral 16 represents an inorganic packing material, reference numeral 17 represents an inorganic plate member and reference numeral 18 represents a packing member.

As described above, according to the this embodiment, the following features and effects can be obtained: (1) the physical voids (gas holes) can be surely formed with time lapse through dissolution or contraction of the hole forming members, so that the internal gas which is produced through the chemical reaction or the like after the core member is formed can be surely discharged through the gas holes to the outside of the panel, and in addition, when the hole forming members are arranged at the boundary between the front surface member and the core member, the internal gas produced between the front surface member and the core member can be discharged through the boundary portion to the outside of the panel at a gas discharge rate which is about 5 to 20 times as high as that in the prior art by about 5 to 20 times; (2) the internal gas is discharged from the boundary portion and the core member to the outside of the panel, so that the deformation of the facing of the panel can be prevented and the external beautiful appearance of the facing can be kept for a long term; and (3) the undesired gas produced between the front surface member and the core member can be discharged to the outside of the panel, so that the unified body of the front surface member and the core member is not broken out, and its mechanical strength can be kept for a long term.

What is claimed is:

1. A sandwich panel, including:
   a front surface member;
   a back surface member;
   a core member which is formed of synthetic resin foam and sandwiched between said front surface member and said back surface member into an unified body; and
   plural gas-permeable members which are provided at at least one of the inside of said core member, the boundary between said core member and said front surface member and the boundary between said core member and said back surface member, whereby internal gas produced in said core member is discharged through said gas-permeable members to the outside of said sandwich panel.

2. The sandwich panel as claimed in claim 1, wherein said core member comprises a plastic foam which is formed by mixing phenol foam resin with an inorganic material which is selected from the group consisting of aluminum hydroxide ($Al(OH)_3$), ammonium polyphosphate, graphite, calcium silicate, and calcium carbonate, and an inorganic board formed at each of a male-type link portion and a female-type link portion which are provided at both ends of said sandwich panel, respectively.

3. The sandwich panel as claimed in claim 2, wherein said inorganic board is formed of a calcium silicate plate, a calcium carbonate plate, a gypsum board, a perlite cement plate, a rock wool plate, a slate plate, an ALC plate, a PC plate, an inorganic light weight material, an inorganic light weight foam, or at least one kind of composite plate of the above materials, or ultrahigh density resin.

4. The sandwich panel as claimed in claim 1, further including microgasholes each of which is formed in said back surface member so as to extend into said core member and has a holding piece at the tip thereof, whereby the internal gas produced in said core member is discharged through said microgasholes to the outside of said sandwich panel more efficiently.

5. The sandwich panel as claimed in claim 4, wherein said microgasholes are formed so as to intercommunicate with said gas-permeable member in said core member.

6. The sandwich panel as claimed in claim 1, further microgasholes each of which is formed in said back surface member so as to extend into said core member and has a holding piece at the tip thereof, and a gas-permeable waterproofing sheet for shielding said microgasholes to prevent water to invade into said core member through said microgasholes.

7. A sandwich panel, including:
   a front surface member;
   a back surface member;
   a core member which is formed of synthetic resin foam and sandwiched between said front surface member and said back surface member into an unified body; and
   a hole forming member which is provided at at least one of the inside of said core member, the boundary between said core member and said front surface member and the boundary between said core member and said back surface member, and is dissolved by components of said core member or contracted to function as a gas discharge pass through which the internal gas produced in said core member is discharged to the outside of said sandwich panel.

8. The sandwich panel as claimed in claim 7, wherein said hole forming member is designed in a string shape, in a tape shape, in a net shape, in a lattice shape or the like.

9. The sandwich panel as claimed in claim 7, wherein said hole forming member is formed of at least one kind of starch, plastic having low melting point which is dissolved or contracted at a temperature of about 60° to 80° C., alginic acid, paraffine, rubber having low melting point and styrene resin.

10. The sandwich panel as claimed in claim 1, wherein said gas-permeable members are formed of cocoon, cotton, hemp, wood, vegetable fiber, animal fiber, synthetic resin fiber or the like.

* * * * *